US009813862B2

(12) United States Patent
Liu et al.

(10) Patent No.: US 9,813,862 B2
(45) Date of Patent: Nov. 7, 2017

(54) PROXIMITY BEACON MANAGEMENT USING A NETWORK DEVICE

(71) Applicant: AEROHIVE NETWORKS, INC., Milpitas, CA (US)

(72) Inventors: Changming Liu, Cupertino, CA (US); Chris Scheers, Palo Alto, CA (US); Jingsong Fu, Palo Alto, CA (US); Haofeng Kou, San Ramon, CA (US); Arun K. Goel, Cupertino, CA (US); Matthew Stuart Gast, San Francisco, CA (US); Joseph R. Fraher, Millbrae, CA (US)

(73) Assignee: Aerohive Networks, Inc., Milpitas, CA (US)

( * ) Notice: Subject to any disclaimer, the term of this patent is extended or adjusted under 35 U.S.C. 154(b) by 87 days.

(21) Appl. No.: 14/715,263

(22) Filed: May 18, 2015

(65) Prior Publication Data

US 2015/0334582 A1    Nov. 19, 2015

Related U.S. Application Data

(60) Provisional application No. 62/000,166, filed on May 19, 2014.

(51) Int. Cl.
*H04W 4/02* (2009.01)

(52) U.S. Cl.
CPC .................. *H04W 4/023* (2013.01)

(58) Field of Classification Search
CPC ..................................................... H04W 4/023
See application file for complete search history.

(56) References Cited

U.S. PATENT DOCUMENTS

| 2010/0103042 A1 | 4/2010 | Bishop et al. |
| 2011/0028093 A1 | 2/2011 | Patel et al. |
| 2012/0101727 A1 | 4/2012 | Mays et al. |
| 2012/0281017 A1 | 11/2012 | Seegers et al. |
| 2013/0226704 A1* | 8/2013 | Fernandez ......... G06Q 30/0261 705/14.58 |
| 2015/0215781 A1* | 7/2015 | Reed ..................... H04L 9/3236 726/5 |

OTHER PUBLICATIONS

International Application No. PCT/US2015/031510, International Search Report and Written Opinion mailed Aug. 20, 2015.

* cited by examiner

*Primary Examiner* — Jianye Wu

(74) *Attorney, Agent, or Firm* — Sheppard, Mullin, Richter & Hampton LLP

(57) ABSTRACT

Management of a proximity beacon transmitter using a network device. Operational characteristics are generated for a proximity beacon transmitter coupled to a network device. The proximity beacon is configured through the network device. It is determined if the proximity beacon transmitter is operating according to the operational characteristics generated for the proximity beacon transmitter. The proximity beacon transmitter is reconfigured to operate according to the operational characteristics if it is determined that the proximity beacon transmitter is operating in nonconformity with the operational characteristics.

20 Claims, 11 Drawing Sheets

US 9,813,862 B2

PROXIMITY BEACON MANAGEMENT USING A NETWORK DEVICE

CROSS-REFERENCE TO RELATED APPLICATIONS

This application claims the benefit of U.S. Provisional Patent Application Ser. No. 62/000,166, filed May 19, 2014, and entitled "Proximity Beacon Management Using a Network Device."

BACKGROUND

An area of ongoing research and development is in improving performance of communication over a network, and in particular a wireless network. Recently low-power advertising devices, also known as proximity beacons, have been created to further expand wireless networks. Such low-power advertising devices typically establish wireless connections with other devices in accordance with low power wireless communication protocols. As proximity beacons are integrated more in wireless networks, there exists needs for effectively managing proximity beacons integrated into wireless networks. In particular there exists needs for effectively managing proximity beacons using already created wireless networks and wireless network devices that form, at least in part, the wireless networks into which proximity beacons are integrated.

The foregoing examples of the related art and limitations related therewith are intended to be illustrative and not exclusive. Other limitations of the relevant art will become apparent to those of skill in the art upon reading the specification and studying of the drawings.

SUMMARY

The following implementations and aspects thereof are described and illustrated in conjunction with systems, tools, and methods that are meant to be exemplary and illustrative, not necessarily limiting in scope. In various implementations one or more of the above-described problems have been addressed, while other implementations are directed to other improvements.

Various implementations include systems and methods for management of a proximity beacon using a network device. In various implementations, operational characteristics are generated for a proximity beacon transmitter coupled to a network device. Further, in various implementations, a proximity beacon transmitter is configured through a network device to which the proximity beacon transmitter is coupled. In various implementations, it is determined if a proximity beacon transmitter is operating according to operational characteristics generated for the proximity beacon transmitter. Additionally, in various implementations, a proximity beacon transmitter is reconfigured to operate according to operational characteristics set for it, if it is determined that the proximity beacon transmitter is operating in nonconformity with the operational characteristics.

These and other advantages will become apparent to those skilled in the relevant art upon a reading of the following descriptions and a study of the several examples of the drawings.

DETAILED DESCRIPTION

Figure 1:
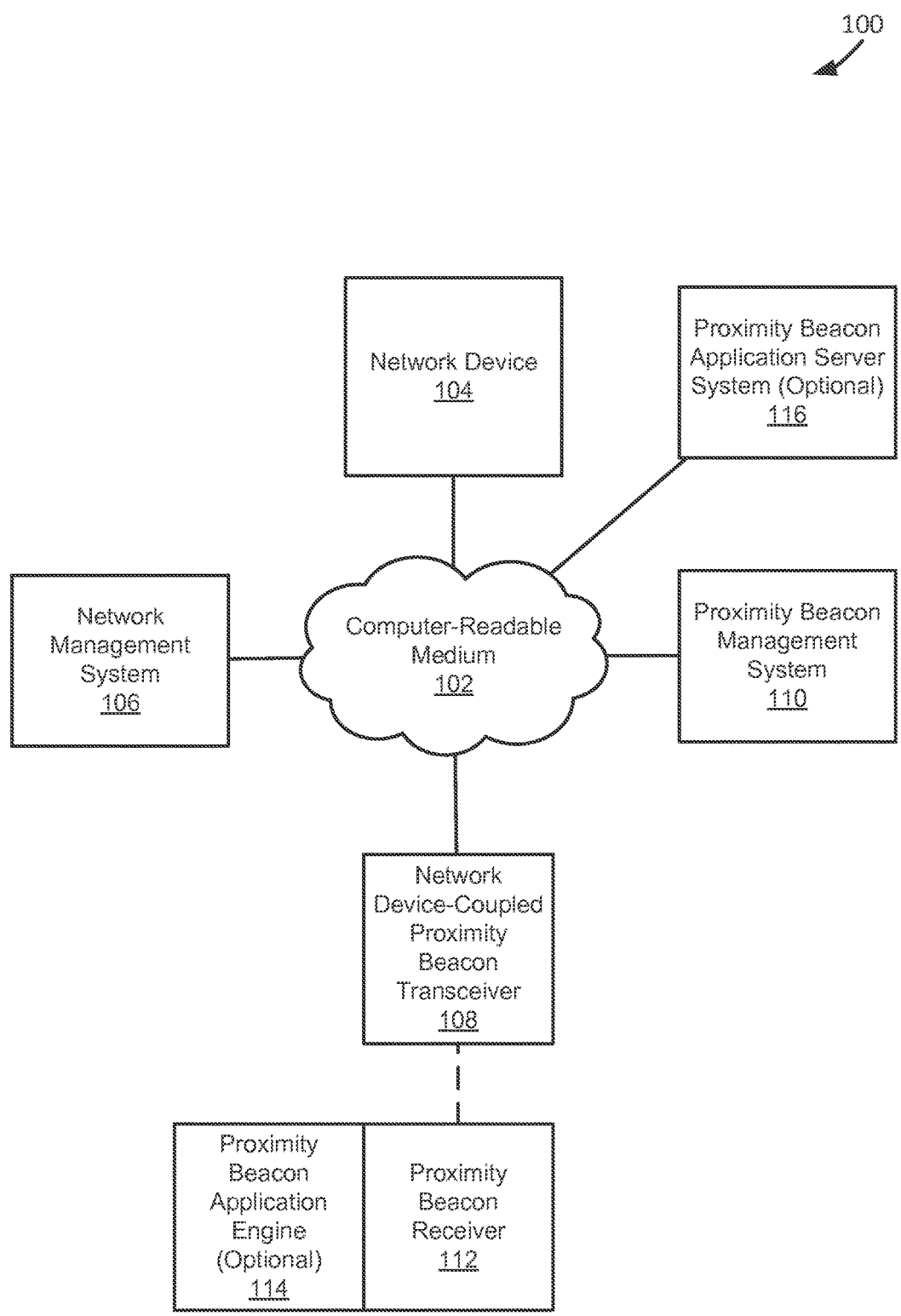
FIG. 1 depicts a diagram of an example of a system for managing proximity beacon transmitters coupled to a network device.

FIG. 1 depicts a diagram 100 of an example of a system for managing proximity beacon transmitters coupled to a network device. The example system shown in FIG. 1 includes a computer-readable medium 102, a network device 104, a network management system 106, a network device-coupled proximity beacon transceiver (hereinafter referred to as "PBT") 108, a proximity beacon receiver (hereinafter referred to as "PBR") 112, and a proximity beacon management system 110. The example system shown in FIG. 1 also optionally includes a proximity beacon application engine 114, included as part of or implemented in conjunction with the proximity beacon receiver, and a proximity beacon application server system 116.

The computer-readable medium 102 is intended to represent a variety of potentially applicable technologies. For example, the computer-readable medium 102 can be used to form a network or part of a network. Where two components are co-located on a device, the computer-readable medium 102 can include a bus or other data conduit or plane. Where a first component is co-located on one device and a second component is located on a different device, the computer-readable medium 102 can include a network.

Assuming the computer-readable medium 102 includes a network, the network can be an applicable communications network, such as the Internet or an infrastructure network. The term "Internet" as used in this paper refers to a network of networks that use certain protocols, such as the TCP/IP protocol, and possibly other protocols, such as the hypertext transfer protocol (HTTP) for hypertext markup language (HTML) documents that make up the World Wide Web ("the web"). More generally, a network can include, for example, a wide area network (WAN), metropolitan area network (MAN), campus area network (CAN), or local area network (LAN), but the network could at least theoretically be of an applicable size or characterized in some other fashion (e.g., personal area network (PAN) or home area network (HAN), to name a couple of alternatives). Networks can include enterprise private networks and virtual private networks (collectively, private networks). As the name suggests, private networks are under the control of a single entity. Private networks can include a head office and optional regional offices (collectively, offices). Many offices enable remote users to connect to the private network offices via some other network, such as the Internet. The example of FIG. 1 is intended to illustrate a computer-readable medium 102 that may or may not include more than one private network.

In the example of FIG. 1, the network device 104, the network management system 106, the network device-coupled PBT 108, and the proximity beacon management system 110 are coupled to each other through the computer-readable medium 102. As used in this paper, a "computer-readable medium" is intended to include all mediums that are statutory (e.g., in the United States, under 35 U.S.C. 101), and to specifically exclude all mediums that are non-statutory in nature to the extent that the exclusion is necessary for a claim that includes the computer-readable medium to be valid. Known statutory computer-readable mediums include hardware (e.g., registers, random access memory (RAM), non-volatile (NV) storage, to name a few), but may or may not be limited to hardware.

The computer-readable medium 102, the network device 104, the network management system 106, the network device coupled PBT 108, the PBR 112, the proximity beacon management system 110, the proximity beacon application engine 114, the proximity beacon application server system 116, and other systems, or devices described in this paper can be implemented as a computer system or parts of a computer system or a plurality of computer systems. A computer system, as used in this paper, is intended to be construed broadly and can include or be implemented as a specific purpose computer system for carrying out the functionalities described in this paper. In general, a computer system will include a processor, memory, non-volatile storage, and an interface. A typical computer system will usually include at least a processor, memory, and a device (e.g., a bus) coupling the memory to the processor. The processor can be, for example, a general-purpose central processing unit (CPU), such as a microprocessor, or a special-purpose processor, such as a microcontroller.

The memory can include, by way of example but not limitation, random access memory (RAM), such as dynamic RAM (DRAM) and static RAM (SRAM). The memory can be local, remote, or distributed. The bus can also couple the processor to non-volatile storage. The non-volatile storage is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software on the computer system. The non-volatile storage can be local, remote, or distributed. The non-volatile storage is optional because systems can be created with all applicable data available in memory.

Software is typically stored in the non-volatile storage. Indeed, for large programs, it may not even be possible to store the entire program in the memory. Nevertheless, it should be understood that for software to run, if necessary, it is moved to a computer-readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at an applicable known or convenient location (from non-volatile storage to hardware registers) when the software program is referred to as "implemented in a computer-readable storage medium." A processor is considered to be "configured to execute a program" when at least one value associated with the program is stored in a register readable by the processor.

In one example of operation, a computer system can be controlled by operating system software, which is a software program that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile storage and causes the processor to execute the various acts required by the operating system to input and output data and to store data in the memory, including storing files on the non-volatile storage.

The bus can also couple the processor to the interface. The interface can include one or more input and/or output (I/O) devices. The I/O devices can include, by way of example but not limitation, a keyboard, a mouse or other pointing device, disk drives, printers, a scanner, and other I/O devices, including a display device. The display device can include, by way of example but not limitation, a cathode ray tube (CRT), liquid crystal display (LCD), or some other applicable known or convenient display device. The interface can include one or more of a modem or network interface. It will be appreciated that a modem or network interface can be considered to be part of the computer system. The interface can include an analog modem, isdn modem, cable modem, token ring interface, satellite transmission interface (e.g. "direct PC"), or other interfaces for coupling a computer system to other computer systems. Interfaces enable computer systems and other devices to be coupled together in a network.

The computer systems can be compatible with or implemented as part of or through a cloud-based computing system. As used in this paper, a cloud-based computing system is a system that provides virtualized computing resources, software and/or information to client devices. The computing resources, software and/or information can be virtualized by maintaining centralized services and resources that the edge devices can access over a communication interface, such as a network. "Cloud" may be a marketing term and for the purposes of this paper can include any of the networks described herein. The cloud-based computing system can involve a subscription for services or use a utility pricing model. Users can access the protocols of the cloud-based computing system through a web browser or other container application located on their client device.

A computer system can be implemented as an engine, as part of an engine or through multiple engines. As used in this paper, an engine includes at least two components: 1) a dedicated or shared processor and 2) hardware, firmware, and/or software modules that are executed by the processor. Depending upon implementation-specific, configuration-specific, or other considerations, an engine can be centralized or its functionality distributed. An engine can be a specific purpose engine that includes specific purpose hardware, firmware, or software embodied in a computer-readable medium for execution by the processor. The processor transforms data into new data using implemented data structures and methods, such as is described with reference to the figures in this paper.

The engines described in this paper, or the engines through which the systems and devices described in this paper can be implemented, can be cloud-based engines. As used in this paper, a cloud-based engine is an engine that can run applications and/or functionalities using a cloud-based computing system. All or portions of the applications and/or functionalities can be distributed across multiple computing devices, and need not be restricted to only one computing device. In some embodiments, the cloud-based engines can execute functionalities and/or modules that end users access through a web browser or container application without having the functionalities and/or modules installed locally on the end-users' computing devices.

As used in this paper, datastores are intended to include repositories having any applicable organization of data, including tables, comma-separated values (CSV) files, traditional databases (e.g., SQL), or other applicable known or convenient organizational formats. Datastores can be implemented, for example, as software embodied in a physical computer-readable medium on a general- or specific-purpose machine, in firmware, in hardware, in a combination thereof, or in an applicable known or convenient device or system. Datastore-associated components, such as database interfaces, can be considered "part of" a datastore, part of some other system component, or a combination thereof, though the physical location and other characteristics of datastore-associated components is not critical for an understanding of the techniques described in this paper.

Datastores can include data structures. As used in this paper, a data structure is associated with a particular way of storing and organizing data in a computer so that it can be used efficiently within a given context. Data structures are generally based on the ability of a computer to fetch and store data at any place in its memory, specified by an address, a bit string that can be itself stored in memory and manipulated by the program. Thus, some data structures are based on computing the addresses of data items with arithmetic operations; while other data structures are based on storing addresses of data items within the structure itself. Many data structures use both principles, sometimes combined in non-trivial ways. The implementation of a data structure usually entails writing a set of procedures that create and manipulate instances of that structure. The datastores, described in this paper, can be cloud-based datastores. A cloud-based datastore is a datastore that is compatible with cloud-based computing systems and engines.

In a specific implementation, the network device 104 functions according to an applicable device for routing, at least in part, data traffic to and from a backend of a network. Depending upon implementation-specific or other considerations, the network device 104 can be a router, a switch, an access point, a gateway, including a wireless gateway, a repeater, or any combination thereof. In functioning as a gateway, the network device 104 can transport data from a backend of a network to a device coupled to the network device 104. In functioning as an access point, the network device 104 can coupled a device coupled to the network device 104 to a network associated with the network device 104. The network device 104 can functions according to applicable protocols for forming part of a wireless network, including Wi-Fi, such as the IEEE 802.11 standards, which are hereby incorporated by reference.

In a specific implementation, the network device 104 is wirelessly coupled through a Wi-Fi connection to a client device, which acts as or includes a station. Depending upon implementation-specific or other considerations, the network device 104 can form a wireless connection to a proximity beacon receiver through a Wi-Fi connection, whereby the proximity beacon receiver functions as a client device by including or acting as a station. A station, as used in this paper, can be referred to as a device with a media access control (MAC) address and a physical layer (PHY) interface to a wireless medium that complies with the IEEE 802.11 standard. Thus, for example, the network devices can be referred to as stations, if applicable. IEEE 802.11a-1999, IEEE 802.11b-1999, IEEE 802.11g-2003, IEEE 802.11-2007, and IEEE 802.11n TGn Draft 8.0 (2009) are incorporated by reference. As used in this paper, a system that is 802.11 standards-compatible or 802.11 standards-compliant complies with at least some of one or more of the incorporated documents' requirements and/or recommendations, or requirements and/or recommendations from earlier drafts of the documents, and includes Wi-Fi systems. Wi-Fi is a non-technical description that is generally correlated with the IEEE 802.11 standards, as well as Wi-Fi Protected Access (WPA) and WPA2 security standards, and the Extensible Authentication Protocol (EAP) standard. In alternative embodiments, a station may comply with a different standard than Wi-Fi or IEEE 802.11, may be referred to as something other than a "station," and may have different interfaces to a wireless or other medium.

In a specific implementation the network management system 106 functions to manage the network device 104. In managing the network device 104, the network managing system 106 can manage the transport of data to and from the network device 104 to a backend of a network. Depending upon implementation-specific or other considerations, the network management system 106 can be 802.11 standards compatible when a client device is coupled to the network device 104 through a Wi-Fi connection. Further depending upon implementation-specific or other considerations, the network management system 106 can function to authenticate a device that is coupled to the network device 104 for a network, and provide services through the network to the device that is coupled to the network device 104.

In a specific implementation, the network device-coupled PBT 108 functions to transmit proximity beacon signals. A proximity beacon signal transmitted by the network device-coupled PBT 108 includes a unique universal identifier (hereinafter referred to as a "uuid"). A uuid included as part of a proximity beacon signal transmitted by the network device-coupled PBT 108 is uniquely associated with the network device-coupled PBT 108 and can be used to specifically identify the network device-coupled PBT 108. A proximity beacon signal transmitted by the network device-coupled PBT 108 can also include a major and a minor value.

In a specific implementation, the network device-coupled PBT 108 is coupled to the network device 104. Depending upon implementation-specific or other considerations, the network device-coupled PBT 108 can be coupled to the network device 104 through a wired connection, e.g. a USB connection, or an Ethernet connection. Further depending upon implementation-specific or other considerations, the network device-coupled PBT 108 can be coupled to the network device 104 through a wireless connection, e.g. a Wi-Fi connection, Bluetooth® or ZigBee®. In being coupled to the network device 104, power can be provided, through the network device 104, to the network device-coupled PBT 108.

In a specific implementation, in being coupled to a network device 104, the network device-coupled PBT 108 can be managed through the network device 104. The network device-coupled PBT 108 can be managed through the network device 104 by an applicable system for managing a network device-coupled PBT 108, such as the proximity beacon management systems described in this paper.

In a specific implementation, the proximity beacon management system 110 functions to manage proximity beacons. The proximity beacon management system 110 can manage PBTs that are coupled to a network device and PBRs that are coupled to the PBTs coupled to the network device. Depending upon implementation-specific or other considerations, in managing proximity beacons, the proximity beacon management system 110 can configure and/or reconfigure proximity beacons. Further depending upon implementation-specific or other considerations, in managing proximity beacons, the proximity beacon management system 110 can manage power of proximity beacons. Depending upon implementation-specific or other considerations, in managing proximity beacons, the proximity beacon management system 110 can manage proximity beacon placement planning and maintenance. Further depending upon implementation-specific or other considerations, in managing proximity beacons, the proximity beacon management system 110 can validate a device that transmits a proximity beacon signal.

In a specific implementation, in managing proximity beacons, the proximity beacon management system 110 functions to configure and/or reconfigure proximity beacons. In configuring and/or calibrating proximity beacons, the proximity beacon management system 110 can set or change operational characteristics of a proximity beacon. Operational characteristics of a proximity beacon can include a uuid, a minor value, and a major value included in a proximity beacon signal transmitted by the proximity beacon, a signal power at which the proximity beacon transmits proximity beacon signals, a rate at which the proximity beacon transmits proximity beacon signals, and a communication protocol, including applicable lower power short range wireless communication protocols, such as Bluetooth® or ZigBee®, through which the proximity beacon either or both transmits and receives signals, including proximity beacon signals. In configuring a proximity beacon, the proximity beacon management system 110 can function to set operational characteristics for the proximity beacon before a proximity beacon is operated or during operation of the proximity beacon. Depending upon implementation-specific or other considerations, the proximity beacon management system 110 can set operational characteristics of a proximity beacon according to either or both standard operational characteristics or input of a manager of the proximity beacon. In calibrating a proximity beacon, the proximity beacon management system 110 can check to make sure that the proximity beacon is operating in accordance within operational characteristics set for the proximity beacon and reconfigure the operational characteristics of the proximity beacon to the operational characteristics set for the proximity beacon.

In a specific implementation, in managing proximity beacons, the proximity beacon management system 110 functions to manage power of proximity beacons. In managing power of proximity beacons, the proximity beacon management system 110 can determine and monitor an amount of available power to a proximity beacon. The proximity beacon management system 110 can determine an amount of power available to a proximity beacon using signals, including proximity beacon signals, transmitted by the proximity beacon. Depending upon implementation-specific or other considerations, the proximity beacon management system 110 can either deliver power to a proximity beacon or send a message to a manager of the proximity beacon that tells the manager to supply power to the proximity beacon. For example, a manager in response to receiving a message form the proximity beacon management system 110 detailing that a proximity beacon has low power, can replace a battery in the proximity beacon.

In a specific implementation, in managing proximity beacons, the proximity beacon management system 110 can function to manage proximity beacon placement planning. In managing proximity beacon placement planning, the proximity beacon management system 110 can generate a proximity beacon floor plan. A proximity beacon floor plan can identify proximity beacons that are supposed to be placed within a certain area. Depending upon implementation specific or other considerations, a proximity beacon floor plan can include an identification of proximity beacons that are placed at locations with a specific area by a manager using proximity beacon placement functionalities provided by the proximity beacon management system 110. A proximity beacon floor plan generated by the managing proximity beacon management system 110 can be used to reconfigure placement of proximity beacons in an area, including moving proximity beacons, and adding or remove proximity beacons from within the area. Further, in managing proximity beacon placement planning, the proximity beacon management system 110 can generate a proximity beacon floor plan that includes coverage of proximity beacons within a specific area, e.g. using operational characteristics of the proximity beacons, that can be used to place more or remove proximity beacons from within the specific area.

In a specific implementation, in managing proximity beacons, the proximity beacon management system 110 functions to manage proximity beacon placement maintenance. In managing proximity beacon placement maintenance, the proximity management system 110 can determine whether a proximity beacon is still within an area that it is supposed to be placed. In determining whether a proximity beacon is still within a specific area that it is supposed to be placed, the proximity beacon management system 110 can compare proximity beacons that the proximity beacon management system 110 determines are within a specific area with a proximity beacon floor plan to determine whether proximity beacons within the specific area are still within the specific area. Depending upon implementation-specific or other considerations, the proximity beacon management system 110 can determine whether a proximity beacon is in a specific area based on whether the proximity beacon is still coupled to a network device within the specific area.

In a specific implementation, in managing proximity beacons, the proximity beacon management system 110 functions to validate a device that transmits a proximity beacon signal. In validating a device that transmits a proximity beacon signal, the proximity beacon management system 110 can determine whether a device that transmits a proximity beacon signal received by an applicable device, e.g. a PBR, is a valid proximity beacon. A valid proximity beacon, as used herein, is a proximity beacon that is uniquely associated with a uuid of a proximity beacon signal. A proximity beacon management system 110 can determine whether a device that transmits a proximity beacon signal is a valid proximity beacon, based on a location of a device that receives the proximity beacon signal. In determining whether a device that transmits a proximity beacon signal is a valid proximity beacon based on a location of a device that receives the proximity beacon signal, the management system 110 can determine whether the device that receives the signal is within proximity to an area that the device that transmits the signal is within. For example, if a device receives a proximity beacon signal but is out of range of the proximity beacon that is uniquely associated to the uuid in the proximity beacon signal, then the proximity beacon management system 110 can determine that the device that transmitted the proximity beacon signal is not a valid proximity beacon. Depending upon implementation-specific or other considerations, a location of a device that receives a proximity beacon signal can be determined through any applicable systems or methods of determining a location of a device, such as GPS. Further depending upon implementation-specific or other considerations, a location of a device that receives a proximity beacon signal can be determined from a network device to which the device is coupled.

In the example of FIG. 1, the PBR 112 is coupled to the network device coupled PBT 108 though a wireless connection, illustrated by a dashed line. Depending upon implementation-specific or other considerations, the PBR 112 can be coupled to the network device-coupled PBT 108 through an applicable lower power short range wireless communication protocol.

In a specific implementation, in being coupled to the network device-coupled PBT 108, the PBR 112 can receive proximity beacon signals transmitted by the network device-coupled PBT 108. The PBR 112 can receive proximity beacon signals transmitted by the network device-coupled PBT 108 through an applicable lower power short range wireless communication protocol. In various implementations, the proximity beacon receiver can be coupled to a network, in addition to a network formed between the network device-coupled PBT 108 and the PBR 112. Depending upon implementation-specific or other considerations, the PBR 112 can be coupled to a network by being coupled to a network device 104. Further depending upon implementation-specific or other considerations, the proximity beacon receiver 112 can be coupled to a cellular network. In various implementations, when the PBR is coupled to a network by the network device 104, the PBR can function as a client device.

In a specific implementation, the proximity beacon application engine 114 functions to provide data to a PBR or provide functionalities to a user of the PBR based on proximity beacon signals received by the PBR. The proximity beacon application engine 114 can provide data associated with a proximity beacon signal received by a PBR. For example, if a PBT is stationed at an entrance to a store and a proximity beacon signal is received by a PBR from the PBT, then the proximity beacon application engine 114 can provide data to the PBR that is used to generate a welcoming to the store. In another example, if a PBT is stationed at a location where products of a certain type are located in a store, and a proximity beacon signal is received by a PBR from the PBT, then the proximity beacon application engine 114 can provide data to the PBR that is used to advertise the products to a user of the PBR. The proximity beacon application engine 114 can provide functionalities associated with a proximity beacon signal received by a PBR. For example, if a PBT is stationed at a location where products of a certain type are located in a store, and a proximity beacon signal is received by a PBR from the PBT, then the proximity beacon application engine 114 can provide functionalities to a user of the PBR through which the user can purchase the products or receive more information on the products.

In a specific implementation, the proximity beacon application server system 116 provides data and functionalities to the proximity beacon application engine 114 that are provided to a PBR in response to proximity beacon signals received by the PBR. Depending upon implementation-specific or other considerations, the proximity beacon application server system 116 can be coupled to the proximity beacon application engine 114 through a network associated with the network device 104, or another applicable network, such as a cellular network. In providing data or functionalities to a PBR, the proximity beacon application server system 116 can interact with other servers or computer systems. For example, the proximity beacon application server system 116 can interact with a product manufacturer's computer system or servers to provide functionalities that allow a user of a PBR to purchase a product. In another example, the proximity beacon application server system can receive product information of a product from a server system of a manufacturer of a product and provide the product information to the proximity beacon application engine 114.

In an example of operation of the example system shown in FIG. 1, the network device 104 functions to provide data to and from a backend of a network or services from the backend of the network to a client device. In the example of operation of the example system shown in FIG. 1, the network management system 106 functions to manage the providing of data and services from the backend of the network by the network device 104. Further, in the example of operation of the example system shown in FIG. 1, the network device-coupled PBT 108 functions to transmit a proximity beacon signal with a uuid uniquely associated with the network device-coupled PBT 108. In the example of operation of the example system shown in FIG. 1, the proximity beacon management system 110 functions to manage the network device-coupled PBT 108. Additionally, in the example of operation of the example system shown in FIG. 1, the PBR 112 functions to receive the proximity beacon signal transmitted by the network device-coupled PBT 108. In the example of operation of the example system shown in FIG. 1, the proximity beacon application engine 114 and the proximity beacon application server system 116 function to provide data and/or functionalities to the PBR 112 based on the proximity beacon signal received by the PBR 112.

Figure 2:
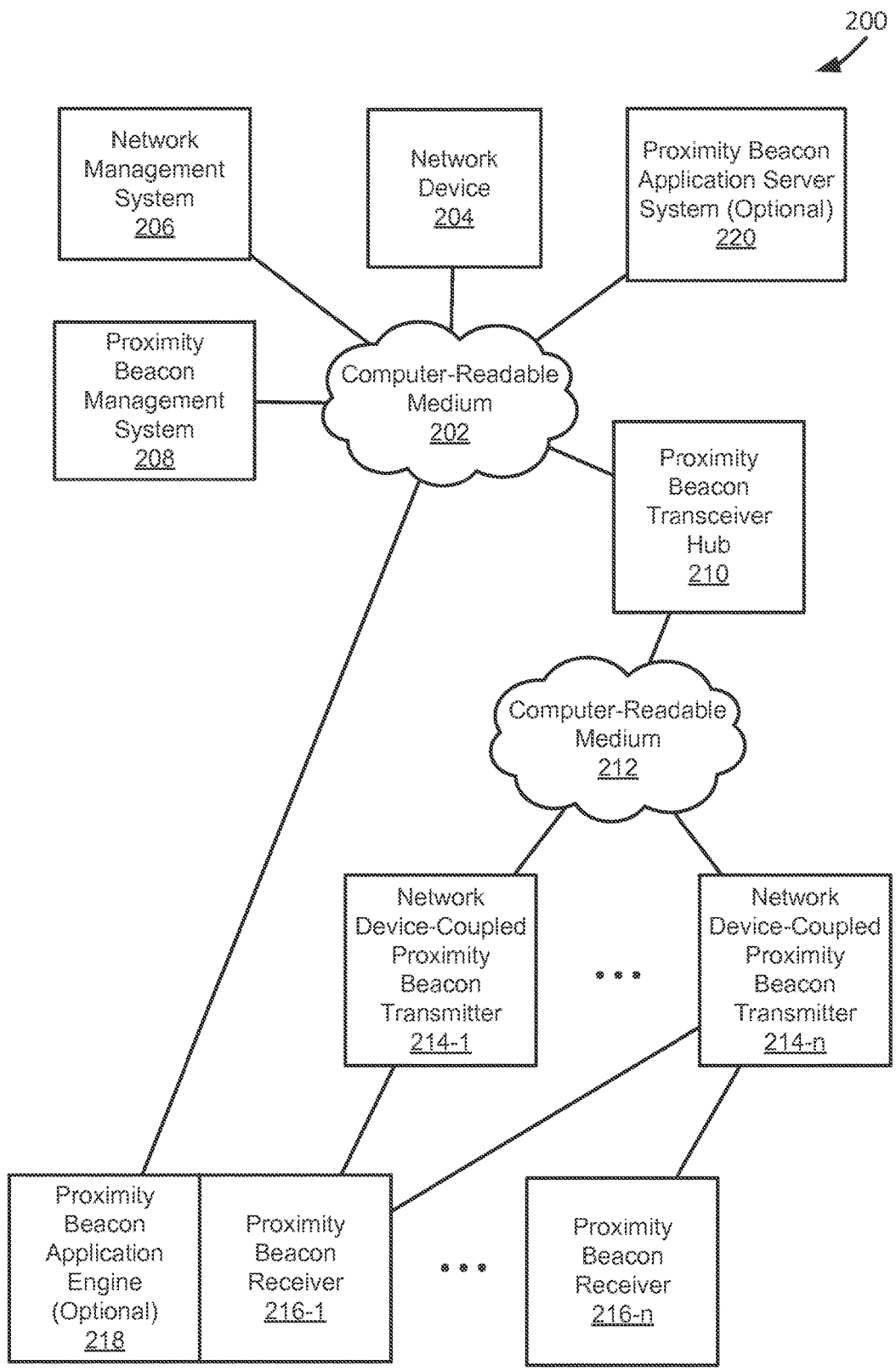
FIG. 2 depicts a diagram of another example of a system for managing proximity beacon transmitters coupled to a network device.

FIG. 2 depicts a diagram 200 of another example of a system for managing PBTs coupled to a network device. The example system shown in FIG. 2 includes a first computer-readable medium 202, a network device 204, a network management system 206, a proximity beacon management system 208, a PBT hub 210, a second computer-readable medium 212, network device-coupled proximity beacon transmitters 214-1 . . . 214-n (hereinafter referred to as "the network device-coupled PBTs 214"), and proximity beacon receivers 216-1 . . . 216-n (hereinafter referred to as "the PBRs 216"). The example system shown in FIG. 2, also optionally includes a proximity beacon application engine 218 and a proximity beacon application server system 220.

In the example system shown in FIG. 2, the network device 204, the network management system 206, the proximity beacon management system 208, the PBT hub 210, and optionally, the proximity beacon application server system 220, are coupled to each other through the first computer-readable medium 202. Depending upon implementation-specific or other considerations, the first computer-readable medium 202 or parts of the first computer-readable medium 202 can form a wired or a wireless connection. For example, the PBT hub 210 can be coupled to the network device 204 through either a wired connection, or a wireless connection.

In a specific implementation, the network device 204 functions according to an applicable device for transmitting data to and from a backhaul of a network, such as the network devices described in this paper. Depending upon implementation-specific or other considerations, the network device 204 can be coupled through a wireless connection to a PBR that acts as a client device in being coupled to the network device 204 through the wireless connection. In being coupled to a PBR through a wireless connection, the network device 204 can transmit data from a backhaul of a network, e.g. from systems coupled to the network device 204 through the backhaul of the network, to the PBR over the wireless connection. For example, the network device 204 can transmit data used in executing a proximity beacon application on a PBR. Depending upon implementation-specific or other considerations, the network device 204 can transmit data to and from PBTs coupled to the network device 204 that is used in managing proximity beacons, including the PBTs coupled to the network device 204 and PBRs coupled to the PBTs coupled to the network device 204.

In a specific implementation, the network management system 206 functions according to an applicable system for managing a network device, such as the network management systems described in this paper. In managing a network device, the network management system 206 can manage the transport of data to and from a network backhaul to the network device. Depending upon implementation-specific or other considerations, the network device management system 206 can authenticate and provided services to client devices coupled to a network device. For example, the network device management system 206 can authenticate a PBR that is coupled to the network device 204.

In a specific implementation, the proximity beacon management system 208 functions according to an applicable system for managing proximity beacons, such as the proximity beacon management systems described in this paper. In managing proximity beacons, the proximity beacon management system 208 can manage PBTs that are coupled to a network device, e.g. through a hub, and PBRs that are coupled to the PBTs coupled to the network device. Depending upon implementation-specific or other considerations, in managing proximity beacons, the proximity beacon management system 208 can configure and/or reconfigure proximity beacons. Further depending upon implementation-specific or other considerations, in managing proximity beacons, the proximity beacon management system 208 can manage power of proximity beacons. Depending upon implementation-specific or other considerations, in managing proximity beacons, the proximity beacon management system 208 can manage proximity beacon placement planning and maintenance. Further depending upon implementation-specific or other considerations, in managing proximity beacons, the proximity beacon management system 208 can validate a device that transmits a proximity beacon signal.

In a specific implementation, the PBT hub 210 functions to couple proximity beacons, including PBTs, to systems and devices coupled to the PBT hub 210 through the first computer-readable medium 202. The PBT hub 210 can couple proximity beacons to the network device 204, thereby making the proximity beacons network device-coupled. Depending upon implementation-specific or other considerations, the PBT hub 210 can couple proximity beacons to the proximity beacon management system 208. In coupling proximity beacons to the proximity beacon management system 208, the PBT hub 210 can transmit data used in managing proximity beacons from the proximity beacon management system 208 to proximity beacons coupled to the PBT hub 210. Depending upon implementation-specific or other considerations, the PBT hub 210 can be a device capable of transmitting data to proximity beacons. For example, the PBT hub 210 can be a dongle or a proximity beacon.

In the example system shown in FIG. 2, the PBT hub 210 is coupled to the network device-coupled proximity beacon transmitters 214 through the second computer readable-medium 212. In coupling a PBT hub 210 to the network device-coupled PBTs 214, the second computer-readable medium 212 can couple the network device-coupled PBTs 214 to the network device 204. Depending upon implementation-specific or other considerations, the second computer-readable medium can be implemented to wirelessly connect the PBT hub 210 to the network device-coupled proximity beacon transmitters through a wireless connection. A wireless connection that connects the PBT hub 210 to the network device-coupled PBTs 214 can be made according to an applicable lower power short range wireless communication protocol. For example, the PBT hub 210 can transmit data used to configure a PBT through a wireless connection formed between the PBT hub 210 and the network-device coupled PBTs 214.

In a specific implementation, the network device-coupled PBTs 214 functions according to applicable devices for transmitting proximity beacon signals, such as the network device-coupled PBTs described in this paper. Proximity beacon signals transmitted by the network device-coupled PBTs 214 include uuids that are uniquely associated with corresponding network device-coupled PBTs 214. Uuids included in proximity beacon signals transmitted by the network device-coupled PBTs 214, can be used to specifically identify the network device-coupled PBTs 214.

In the example system shown in FIG. 2, the PBRs 216 are coupled to network device-coupled PBTs 214. Depending upon implementation-specific or other considerations, multiple PBRs can be coupled to a network device-coupled PBT and a PBR can be coupled to multiple network device-coupled PBTs. In the example system shown in FIG. 2, PBR 216-1 is coupled to both network device-coupled PBT 214-1 and network device-coupled PBT 214-n, while PBR 216-n is coupled to network device-coupled PBT 214-n. The PBRs 214 can be coupled to the network device-coupled PBTs 214 through a wireless connection, including connections formed in accordance with applicable lower power short range wireless communication protocol.

In a specific implementation, the PBRs 216 function according to an applicable device for receiving a proximity beacon signal, such as the PBRs described in this paper. The PBRs 216 can receive proximity beacon signals transmitted by the network device-coupled PBTs 214 to which the PBRs 216 are coupled. Depending upon implementation-specific or other considerations, the PBRs 216 can be directly coupled to the first computer-readable medium 202 and systems or devices coupled to the first computer-readable medium 202. Further depending upon implementation-specific or other considerations, the first computer-readable medium 202 can be implemented to form a wireless connection between the PBRs 216 and systems and devices coupled to the first computer-readable medium 202. For example, the PBRs 216 can be coupled to the network device 204 through a wireless connection. In another example, the PBRs 216 can be coupled to the proximity beacon application server system through a wireless connection. A wireless connection that couples the PBRs 216 to the systems and devices coupled to the computer-readable medium 202 can be made in accordance to an applicable protocol for establishing a wireless connection, such as a Wi-Fi wireless connection or a cellular wireless connection.

In a specific implementation, the proximity beacon application engine 218 functions according to an applicable engine for providing data and/or functionalities to a user of a PBR, based on received proximity beacon signals, such as the proximity beacon application engines described in this paper. Depending upon implementation-specific or other considerations, the proximity beacon application engine 218 can provide data associated with a proximity beacon signal received by a PBR. For example, if a PBT is stationed at an entrance to a store and a proximity beacon signal is received by a PBR from the PBT, then the proximity beacon application engine 218 can provide data to the PBR that is used to generate a welcoming to the store. The proximity beacon application engine 218 can provide functionalities associated with a proximity beacon signal received by a PBR. For example, if a PBT is stationed at a location where products of a certain type are located in a store, and a proximity beacon signal is received by the PBR from the PBT, then the proximity beacon application engine 218 can provide functionalities to a user of the PBR through which the user can purchase the products or receive more information on the products.

In a specific implementation, the proximity beacon application server system 220 functions according to an applicable system for providing data and/or functionalities to a PBR through the proximity beacon application engine 218 in response to proximity beacon signals received by the PBR, such as the proximity beacon application server systems described in this paper. Depending upon implementation-specific or other considerations, the proximity beacon application server system 220 can be coupled to the proximity beacon application engine 218 through a network associated with the network device 204, or another applicable network, such as a cellular network. In providing data or functionalities to a PBR, the proximity beacon application server system 220 can interact with other servers or computer systems. For example, the proximity beacon application server system 220 can interact with a product manufacturer's computer system or servers to provide functionalities that allow a user of a PBR to purchase a product. In another example, the proximity beacon application server system can receive product information of a product from a server system of a manufacturer of a product and provide the product information to the proximity beacon application engine 114.

In an example of operation of the example system shown in FIG. 2, the network device 204 functions to transmit data to and from a backhaul of a network. In the example of operation of the example system shown in FIG. 2, the network management system 206 functions to manage the transmission of data to and from a backhaul of a network by the network device 204. Further, in the example of operation of the example system shown in FIG. 2, the PBT hub 210 functions to couple the network device-coupled PBTs 214 to the network device 204. In the example of operation of the example system shown in FIG. 2, the proximity beacon management system 208 functions to manage the network device-coupled PBTs 214 through the PBT hub 210. Additionally, in the example of operation of the example system shown in FIG. 2, the network device-coupled PBTs 214 function to transmit proximity beacon signals to the PBRs 216. In the example of operation of the example system shown in FIG. 2, the proximity beacon application engine 218 and the proximity beacon application server system 220 provide data and/or functionalities to the PBRs 216 in response to proximity beacon signals received by the PBRs 216.

Figure 3:
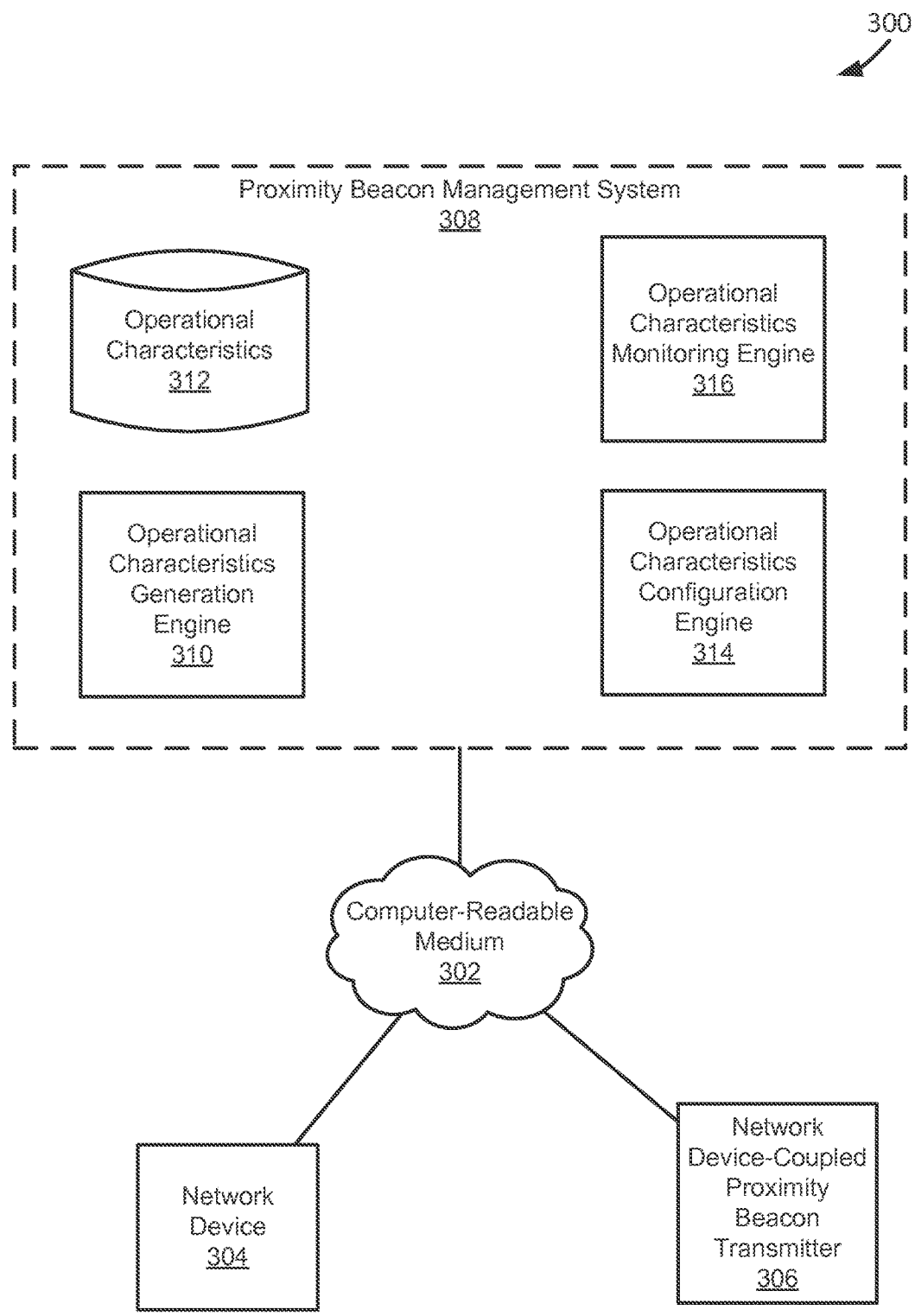
FIG. 3 depicts a diagram of an example of a system for configuring and calibrating operational characteristics of proximity beacons using a network device.

FIG. 3 depicts a diagram 300 of an example of a system for configuring and calibrating operational characteristics of proximity beacons using a network device. The example system shown in FIG. 3 includes a computer-readable medium 302, a network device 304, a network device-coupled PBT 306, and a proximity beacon management system 308. In the example system shown in FIG. 3, the network device, the network device-coupled PBT 306, and the proximity beacon management system 308 are coupled to each other through the computer-readable medium 302.

In a specific implementation, the network device 304 functions according to an applicable device for transmitting data to and from a backhaul of a network, such as the network devices described in this paper. Depending upon implementation-specific or other considerations, the network device 304 can transmit data to and from PBTs coupled to the network device 304 that is used in managing proximity beacons, including the PBTs coupled to the network device 304 and PBRs coupled to the PBTs coupled to the network device 304. For example, the network device 304 can transmit data between a PBT and a proximity beacon management system that is used in managing the PBT. Further depending upon implementation-specific or other considerations, the network device 304 can be coupled through a wireless connection to a PBR that acts as a client device in being coupled to the network device 304 through the wireless connection. In being coupled to a PBR through a wireless connection, the network device 304 can transmit data from a backhaul of a network, e.g. from systems coupled to the network device 304 through the backhaul of the network, to the PBR over the wireless connection.

In a specific implementation, the network device-coupled PBT 306 functions according to applicable devices for transmitting proximity beacon signals, such as the network device-coupled PBTs described in this paper. Proximity beacon signals transmitted by the network device-coupled PBT 306 include a uuid that is uniquely associated with the network device-coupled PBT 306. A Uuid included in a proximity beacon signal transmitted by the network device-coupled PBT 306, can be used to specifically identify the network device-coupled PBT 306.

In a specific implementation, the network device-coupled PBT 306 is coupled to the network device 304. Depending upon implementation-specific or other considerations, the network device-coupled PBT 306 can be directly coupled to the network device 304 through either a wired or wireless connection. Further depending upon implementation-specific or other considerations, the network device-coupled PBT 306 can be coupled to the network device 304 through a PBT hub.

In a specific implementation, the proximity beacon management system 308 functions according to an applicable system for managing proximity beacons, such as the proximity beacon management systems described in this paper.

Depending upon implementation-specific or other considerations, the proximity beacon management system 308 can transmit and receive data through a network device to a network device-coupled PBT. Further depending upon implementation-specific or other considerations, the proximity beacon management system 308 can transmit and receive data through a PBT hub connected to a network device to a network device-coupled PBT. In managing proximity beacons, the proximity beacon management system 308 can configure and/or reconfigure proximity beacons.

In the example system shown in FIG. 3, the proximity beacon management system 308 includes, an operational characteristics generation engine 310, an operational characteristics datastore 312, an operational characteristics configuration engine 314, and an operational characteristics monitoring engine 316. In a specific implementation, the operational characteristics generation engine 310 functions to generate operational characteristics for a proximity beacon. Depending upon implementation-specific or other considerations, the operational characteristics generation engine 310 can change operational characteristics of a proximity beacon. Operational characteristics of a proximity beacon can include applicable parameters related to operation of a proximity beacon, such as a uuid, a minor value, and a major value included in a proximity beacon signal transmitted by the proximity beacon, a signal power at which the proximity beacon transmits proximity beacon signals, a rate at which the proximity beacon transmits proximity beacon signals, and a communication protocol, including applicable lower power short range wireless communication protocol, through which the proximity beacon either or both transmits and receives signals, including proximity beacon signals. Depending upon implementation-specific or other considerations, the operation characteristics generation engine 310 can generate operational characteristics for a proximity beacon before the proximity beacon is operated, or change already generated operational characteristics for the proximity beacon as the proximity beacon is being operated.

In a specific implementation, the operational characteristics generation engine 310 can generate operational characteristics for a proximity beacon from input received from a manager or an authority over the proximity beacon. For example, the operational characteristics generation engine 310 can receive input from a manager over a proximity beacon, that indicates that the proximity beacon should transmit a proximity beacon signal four times every minute. As a result, the operational characteristics generation engine 310 can generate operational characteristics for the proximity beacon that specify to transmit a proximity beacon signal four times every minute. In another example, the operational characteristics generation engine 310 can generate operational characteristics for a specific proximity beacon that includes a uuid for the proximity beacon to include in proximity beacon signals transmitted by the proximity beacon, as specific in input received from a user.

In a specific implementation, the operational characteristics generation engine 310 can generate operational characteristics for a proximity beacon independent of input received from a manager or an authority over the proximity beacon. Depending upon implementation-specific or other considerations, the operational characteristics generation engine 310 can generate a random uuid for a proximity beacon that the proximity beacon includes in transmitted proximity beacon signals. Further depending upon implementation-specific or other considerations, the operational characteristics generation engine 310 can generate operational characteristics for a proximity beacon based on operational characteristics of similar proximity beacons. Proximity beacons can be similar if they operate in the same or neighboring regions, are used to advertise related messages or represent related devices, ideas, or the like, are of similar fabrication type, or are otherwise related. For example, if proximity beacon will be placed in a region with another already placed proximity beacon, then the operational characteristics generation engine 310 can generate operational characteristics for the proximity beacon that are the same, except for uuid, as operational characteristics of the already placed proximity beacon.

In a specific implementation, the operational characteristics datastore 312 functions to store operational characteristics for proximity beacons. Operational characteristics can be stored in the operational characteristics datastore 312 along with an identifier that uniquely identifies a proximity beacon for which the operational characteristics were generated. Operational characteristics stored in the operational characteristics datastore 312 can be generated by the operational characteristics generation engine 310. Depending upon implementation-specific or other considerations, the operational characteristics generation engine 310 can update operational characteristics of a proximity beacon stored in the operational characteristics datastore 312 during operation of the proximity beacon.

In a specific implementation, the operational characteristics configuration engine 314 functions to configure a proximity beacon according to generated operational characteristics for the proximity beacon. Depending upon implementation-specific or other considerations, in configuring a proximity beacon according to generated operational characteristics for the proximity beacon, the operational characteristics configuration engine 314 can program a proximity beacon to operate according to the operational characteristics through a network device to which the proximity beacon is coupled. Further depending upon implementation-specific or other considerations, in configuring a proximity beacon, the operational characteristics configuration engine 314 can generate and send operational instructions to the proximity beacon through a network device to which the proximity beacon is coupled. The operational characteristics configuration engine 314 can generate operational instructions that instruct a proximity beacon to operate according to operational characteristics for the proximity beacon. For example, the operational characteristics configuration engine 314 can generate operational instructions that instruct a proximity beacon to include a uuid in proximity beacon signals transmitted by the proximity beacon, as indicated by operational characteristics for the proximity beacon. The operational characteristics configuration engine 314 can configure a proximity beacon using operational characteristics for the proximity beacon generated by the operational characteristics engine 310 and/or stored in the operational characteristics datastore 312.

In a specific implementation, the operational characteristics monitoring engine 316 functions to monitor operational characteristics at which a proximity beacon is operating. In monitoring operational characteristics, the operational characteristics monitoring engine 316 can receive data, used to determine operational characteristics of a proximity beacon from the proximity beacon through a network device to which the proximity beacon is coupled. Data received from a proximity beacon can be a transmitted proximity beacon signal or status message, either of which include the operational characteristics at which the proximity beacon is operating. For example, the operational characteristics monitoring engine 316 can receive a proximity beacon signal that includes the rate at which a proximity beacon is transmitting proximity beacon signals. Depending upon implementation-specific or other considerations, a proximity beacon can be configured to send data used by the operational characteristics monitoring engine 316 in determining operational characteristics at which the proximity beacon is operating automatically at set times, or after being pinged by the operational characteristics monitoring engine 316.

In a specific implementation, the operational characteristics monitoring engine 316 functions to determine whether a proximity beacon is operating according to operational characteristics set for it. Specifically, the operational characteristics monitoring engine 316 can compare operational characteristics that a proximity beacon is operating at, with operational characteristics set for the proximity beacon to determine whether the proximity beacon is operating according to operational characteristics set for it. In comparing operational characteristics that a proximity beacon is operating at with operational characteristics set for it by retrieving operational characteristics set for the proximity beacon from the operational characteristics datastore 312 using an identification of the proximity beacon. For example, the operational characteristics monitoring engine 316 can determine that a proximity beacon is not operating at operational characteristics set for it, if the operational characteristics specify that the proximity beacon is supposed to transmit proximity beacon signals at a specific power level or range of power levels, and it is determined that the proximity beacon is transmitting proximity beacon signal at a higher level than the specific power level or range of power levels.

In a specific implementation, the operational characteristics configuration engine 314 can reconfigure a proximity beacon if the operational characteristics monitoring engine 316 determines that the proximity beacon is not operating at operational characteristics set for the proximity beacon. Depending upon implementation-specific or other considerations, in reconfiguring a proximity beacon, the operational characteristics configuration engine 314 can reprogram the proximity beacon and/or regenerate and send operational instructions to the proximity beacon through a network device to which the proximity beacon is coupled.

In an example of operation of the example system shown in FIG. 3, the network operational characteristics generation engine 310 functions to generate operational characteristics for the network device-coupled PBT 306. In the example of operation of the example system shown in FIG. 3, the operational characteristics datastore 312 stores operational characteristics of the network device-coupled PBT 306 generated by the operational characteristics generation engine 310. Further, in the example of operation of the example system shown in FIG. 3, the operational characteristics configuration engine functions to configure the network device-coupled proximity beacon transmitter 306 through the network device 304 according to operational characteristics generated by the operational characteristics generation engine 310. In the example of operation of the example system shown in FIG. 3, the operational characteristics monitoring engine 316 functions to determine whether operational characteristics at which the network device-coupled PBT 306 is operating at match the operational characteristics generated by the operational characteristics generation engine 310 and used to configure the network device-coupled PBT 306. Additionally, in the example of operation of the example system shown in FIG. 3, if the operational characteristics monitoring engine 316 determines that the network device-coupled PBT 306 is not operating at operational characteristics set for it, then the operational characteristics configuration engine 314 can reconfigure the network device-coupled proximity beacon transmitter 306 to operate at the operational characteristics set for it.

Figure 4:
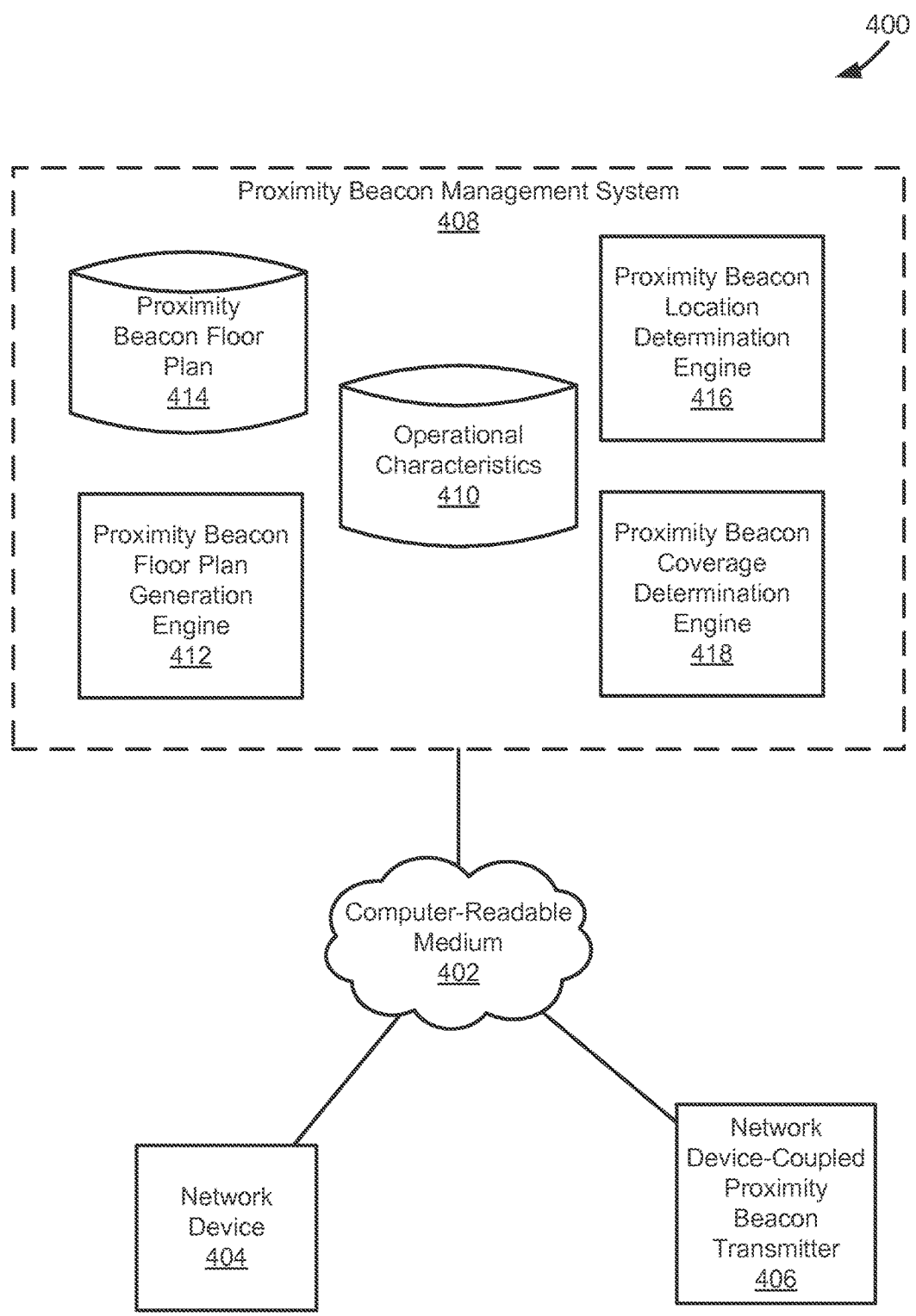
FIG. 4 depicts a diagram of an example of a system for managing proximity beacon placement planning and maintenance using a network device.

FIG. 4 depicts a diagram 400 of an example of a system for managing proximity beacon placement planning and maintenance using a network device. The example system shown in FIG. 4 includes a computer-readable medium 402, a network device 404, a network device-coupled PBT 406, and a proximity beacon management system 408. In the example system shown in FIG. 4, the network device 404, the network device-coupled PBT 406, and the proximity beacon management system 408, are coupled to each other through the computer-readable medium 402.

In a specific implementation, the network device 404 functions according to an applicable device for transmitting data to and from a backhaul of a network, such as the network devices described in this paper. Depending upon implementation-specific or other considerations, the network device 404 can transmit data to and from PBTs coupled to the network device 404 that is used in managing proximity beacons, including the PBTs coupled to the network device 404 and PBRs coupled to the PBTs coupled to the network device 404. For example, the network device 404 can transmit data between a PBT and a proximity beacon management system that is used in managing the PBT. Further depending upon implementation-specific or other considerations, the network device 404 can be coupled through a wireless connection to a PBR that acts as a client device in being coupled to the network device 404 through the wireless connection. In being coupled to a PBR through a wireless connection, the network device 404 can transmit data from a backhaul of a network, e.g. from systems coupled to the network device 404 through the backhaul of the network, to the PBR over the wireless connection.

In a specific implementation, the network device-coupled PBT 406 functions according to applicable devices for transmitting proximity beacon signals, such as the network device-coupled PBTs described in this paper. Proximity beacon signals transmitted by the network device-coupled PBT 406 include a uuid that is uniquely associated with the network device-coupled PBT 406. A uuid included in a proximity beacon signal transmitted by the network device-coupled PBT 406, can be used to specifically identify the network device-coupled PBT 406.

In a specific implementation, the network device-coupled PBT 406 is coupled to the network device 404. Depending upon implementation-specific or other considerations, the network device-coupled PBT 406 can be directly coupled to the network device 404 through either a wired or wireless connection. Further depending upon implementation-specific or other considerations, the network device-coupled PBT 406 can be coupled to the network device 404 through a PBT hub.

In a specific implementation, the proximity beacon management system 408 functions according to an applicable system for managing proximity beacons, such as the proximity beacon management systems described in this paper. Depending upon implementation-specific or other considerations, the proximity beacon management system 408 can transmit and receive data through a network device to a network device-coupled PBT. Further depending upon implementation-specific or other considerations, the proximity beacon management system 408 can transmit and receive data through a PBT hub connected to a network device to a network device-coupled PBT. In managing proximity beacons, the proximity beacon management system 408 can manage proximity beacon placement planning and maintenance.

In the example system shown in FIG. 4, the proximity beacon management system 408 includes an operational characteristics datastore 410, a proximity beacon floor plan generation engine 412, a proximity beacon floor plan datastore 414, a proximity beacon location determination engine 416, and a proximity beacon coverage determination engine 418. In a specific implementation, the operational characteristics datastore 410 functions according to an applicable datastore for storing operational characteristics of a proximity beacon, such as the operational characteristics datastores described in this paper. Operational characteristics stored in the operational characteristics datastore 410 can be the operational characteristics at which a proximity beacon is supposed to operate.

In a specific implementation, the proximity beacon floor plan generation engine 412 functions to generate a proximity beacon floor plan. A proximity beacon floor plan can include a 2D representation of an area or a 3D representation of a volume of space of which the area is a footprint. Depending upon implementation-specific or other considerations, a proximity beacon floor plan can include 2D representations or 3D representations of objects within an area or a volume of space of which the area is a footprint. For example, the proximity beacon floor plan can include a representation that includes a table according to the dimensions of the table placed within an area or a volume of space of which the area is a footprint. Depending upon implementation-specific or other considerations, a proximity beacon floor plan can include characteristics of objects within an area or a volume of space of which the area is a footprint. For example, if an object is a table upon which certain products are placed, then a proximity beacon floor plan can include characteristics of the table that indicate that the certain products are placed on the table. A proximity beacon floor plan can also include indications of locations of network devices within an area or a volume of space of which the area is a footprint. Additionally, a proximity beacon floor plan can include indications of proximity beacon locations within an area or a volume of space of which the area is a footprint. A proximity beacon floor plan can also include an identification of specific proximity beacons positioned at locations within an area or a volume of space of which the area is a footprint.

In a specific implementation, the proximity beacon floor plan generation engine 412 functions to move or add indications of proximity beacon locations as proximity beacons are placed or moved within an area or a volume of space of which the area is a footprint. Depending upon implementation-specific or other considerations, the proximity beacon floor plan generation engine 412 can move or add indications of proximity beacon locations in response to input. For example, the proximity beacon floor plan generation engine 412 can move or add indications of proximity beacon locations in response to input received from a user placing proximity beacons, indicating a location of a proximity beacon. A user can generate input regarding the placement of proximity beacons by viewing a proximity beacon floor plan on a device and selecting locations in the proximity beacon floor plan through the device. Depending upon implementation-specific or other considerations, a user can view a proximity beacon floor plan and generate input regarding the placement of proximity beacons using a device that is coupled to a network, including through a cellular network, or a wireless network formed through the network device 404. Further depending upon implementation-specific or other considerations, in generating input regarding the placement of proximity beacons using a device that is coupled to a network, a user can mark the location of a proximity beacon in relation to a location of a network device, as indicated on the proximity beacon floor plan.

In a specific implementation, the proximity beacon floor plan datastore 414 functions to store a proximity beacon floor plan. A proximity beacon floor plan stored in the proximity beacon floor plan datastore 414 can be updated as proximity beacons are moved to new locations, and new proximity beacons are added to an area or a volume of space of which the area is a footprint. Depending upon implementation-specific or other considerations, a proximity beacon floor plan stored in the proximity beacon floor plan datastore 414 can be generated and/or updated by the proximity beacon floor plan generation engine 412.

In a specific implementation, a proximity beacon location determination engine 416, functions to determine whether a proximity beacon is still at a location at which the proximity beacon is supposed to be positioned. Depending upon implementation-specific or other considerations, a location at which a proximity beacon is supposed to be positioned can include either an original position that the proximity beacon is placed at or a position that the proximity beacon is moved to within an area or a volume of space of which the area is a footprint. In determining whether a proximity beacon is still at a location at which the proximity beacon is supposed to be positioned, the proximity beacon location determination engine 416 can determine the location at which the proximity beacon is supposed to be positioned from a proximity beacon floor plan and a one or plurality of network devices supposed to be nearest to the proximity beacon.

In a specific implementation, the proximity beacon location determination engine 416 functions to determine that an indication of a location of a proximity beacon in a proximity beacon floor plan is the location at which the proximity beacon is supposed to be positioned. The proximity beacon location determination engine 416 can also determine that one or a plurality of network devices nearest the indication of a location of a proximity beacon in a proximity beacon floor plan are network devices supposed to be nearest to the proximity beacon. In determining whether a proximity beacon is still at a location at which the proximity beacon is supposed to be positioned, the proximity beacon location determination engine 416 can determine whether one or a plurality of network devices, e.g. network device 404, supposed to be nearest to the proximity beacon are still receiving data, e.g. a proximity beacon signal, from the proximity beacon. If the proximity beacon location determination engine 416 determines that a one or a plurality of network devices supposed to be nearest to a proximity beacon are not receiving data from the proximity beacon, then the proximity beacon location determination engine 416 can determine that the proximity beacon is not positioned at a location that is supposed to be positioned.

In a specific implementation, the proximity beacon location determination engine 416 determines a region that a proximity beacon is located. Depending upon implementation-specific or other considerations, the proximity beacon location determination engine 416 can determine a region that a proximity beacon is located if it is not in a location at which it is supposed to be positioned. In determining a region that a proximity beacon is located, the proximity beacon location determination engine 416 can determine one or a plurality of network devices that are receiving data from a proximity beacon, e.g. a proximity beacon that has been moved from a location at which it is supposed to be positioned. Further in determining a region that a proximity beacon is located, the proximity beacon location determination engine 416 can use locations of network devices within an area or a volume of space of which the area is a footprint, as determined from a proximity beacon floor plan, to determine a region in that the proximity beacon is located. Additionally, in determining a region that a proximity beacon is located, the proximity beacon location determination engine 416 can use operational characteristics, e.g. a transmit signal power of a proximity beacon, to determine a maximum radius away from a network device that the proximity beacon can be located. For example, if the proximity beacon location determination engine 416 determines that a network device is receiving data from a proximity beacon, then the proximity beacon location determination engine 416 can determine that the proximity beacon is within a region defined by a maximum radius around the network device.

In a specific implementation, the proximity beacon location determination engine 416 functions to generate and send a proximity beacon location warning message to a user device if it is determined that a proximity beacon is not in a location in which the proximity beacons is supposed to be positioned. A proximity beacon location warning message can include an identification of a proximity beacon that is not positioned at a location at which it is supposed to be positioned. A proximity beacon location warning message can also include a region in which a proximity beacon is actually positioned. The proximity beacon location determination engine 416 can send a proximity beacon location warning message to a user device, e.g. a device used by a manager of proximity beacons. The proximity beacon location determination engine 416 can send a proximity beacon location warning message to a user device through a network, e.g. a cellular network, or a wireless network formed in part through a wireless connection between the user device and a network device.

In a specific implementation, the proximity beacon coverage determination engine 418 functions to determine coverage of proximity beacons. Coverage of proximity beacons can include a maximum radius around a proximity beacon at which a PBR can received a proximity beacon signal transmitted by the proximity beacon. The proximity beacon coverage determination engine 418 can determine coverage of a proximity beacon based on operational characteristics set for the proximity beacon. For example, the proximity beacon coverage determination engine 418 can determine coverage of a proximity beacon based on a power at which the proximity beacon is set to transmit proximity beacon signals, as indicated by operational characteristics.

In a specific implementation, the proximity beacon floor plan generation engine 412 can include indicators of coverage of a proximity beacon, as determined by the proximity beacon coverage determination engine 418, in a proximity beacon floor plan. Indicators of coverage can include a shaded or other signifying region around a proximity beacon for the coverage of the proximity beacon. Depending upon implementation-specific or other considerations, a user can use a proximity beacon floor plan, including coverage of proximity beacons in the floor plan to manage positioning of proximity beacons, including managing placement of new proximity beacons and moving of proximity beacons.

In an example of operation of the example system shown in FIG. 4, the proximity beacon floor plan generation engine 412 generates a proximity beacon floor plan, including the network device-coupled PBT 406, that is stored in the proximity beacon floor plan datastore 414. In the example of operation of the example system shown in FIG. 4, the proximity beacon location determination engine 416 determines whether the network device-coupled PBT 406 is at a location at which it is supposed to be positioned using the proximity beacon floor plan and a network device, e.g. network device 404, that receives data from the network device-coupled PBT 406. Further, in the example of operation of the example system shown in FIG. 4, the proximity beacon location determination engine 416 can generate and send a proximity beacon location warning message indicating that the network device-coupled PBT 406 is not at a location at which it is supposed to be, to a user. In the example of operation of the example system shown in FIG. 4, the proximity beacon coverage determination engine 418 determines a coverage of the network device-coupled PBT 408. Additionally, in the example of operation of the example system shown in FIG. 4, the proximity beacon floor plan generation engine 412 modifies the proximity beacon floor plan to indicate the coverage of the network device-coupled PBT 406.

Figure 5:
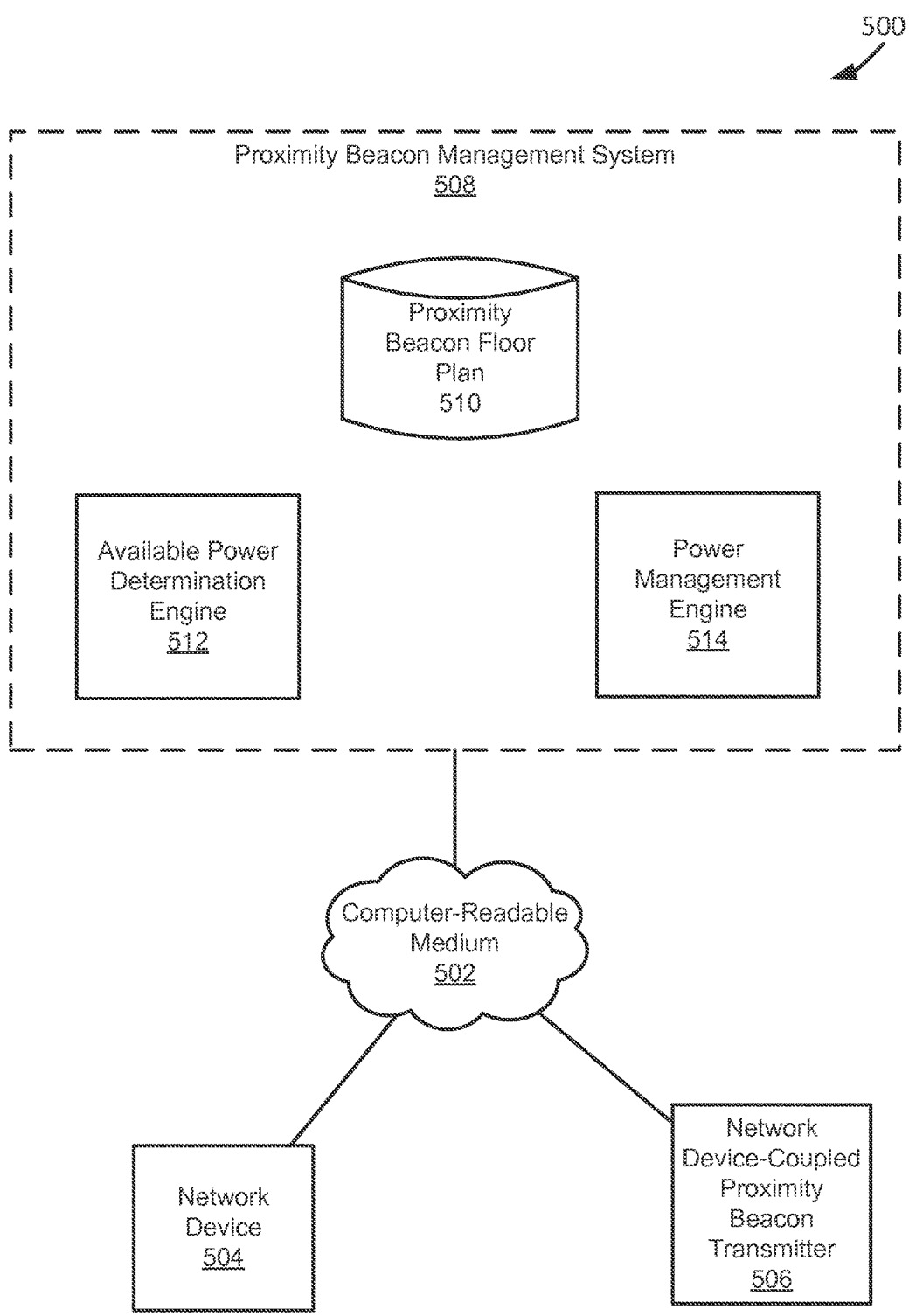
FIG. 5 depicts a diagram of an example of a system for managing power in proximity beacons using a network device.

FIG. 5 depicts a diagram 500 of an example of a system for managing power in proximity beacons using a network device. The example system shown in FIG. 5 includes a computer-readable medium 502, a network device 504, a network device-coupled PBT 506, and a proximity beacon management system 508. In the example system shown in FIG. 5, the network device 504, the network device-coupled PBT 506, and the proximity beacon management system 508 are coupled to each other through the computer-readable medium.

In a specific implementation, the network device 504 functions according to an applicable device for transmitting data to and from a backhaul of a network, such as the network devices described in this paper. Depending upon implementation-specific or other considerations, the network device 504 can transmit data to and from PBTs coupled to the network device 504 that is used in managing proximity beacons, including the PBTs coupled to the network device 504 and PBRs coupled to the PBTs coupled to the network device 504. For example, the network device 504 can transmit data between a PBT and a proximity beacon management system that is used in managing the PBT. Further depending upon implementation-specific or other considerations, the network device 504 can be coupled through a wireless connection to a PBR that acts as a client device in being coupled to the network device 504 through the wireless connection. In being coupled to a PBR through a wireless connection, the network device 504 can transmit data from a backhaul of a network, e.g. from systems coupled to the network device 504 through the backhaul of the network, to the PBR over the wireless connection.

In a specific implementation, the network device-coupled PBT 506 functions according to applicable devices for transmitting proximity beacon signals, such as the network device-coupled PBTs described in this paper. Proximity beacon signals transmitted by the network device-coupled PBT 506 include a uuid that is uniquely associated with the network device-coupled PBT 506. A Uuid included in a proximity beacon signal transmitted by the network device-coupled PBT 506, can be used to specifically identify the network device-coupled PBT 506.

In a specific implementation, the network device-coupled PBT 506 is coupled to the network device 504. Depending upon implementation-specific or other considerations, the network device-coupled PBT 506 can be directly coupled to the network device 504 through either a wired or wireless connection. Further depending upon implementation-specific or other considerations, the network device-coupled PBT 506 can be coupled to the network device 504 through a PBT hub.

In a specific implementation, the proximity beacon management system 508 functions according to an applicable system for managing proximity beacons, such as the proximity beacon management systems described in this paper. Depending upon implementation-specific or other considerations, the proximity beacon management system 508 can transmit and receive data through a network device to a network device-coupled PBT. Further depending upon implementation-specific or other considerations, the proximity beacon management system 508 can transmit and receive data through a PBT hub connected to a network device to a network device-coupled PBT. In managing proximity beacons, the proximity beacon management system 508 can manage proximity beacon power.

In the example system shown in FIG. 5, the proximity beacon management system 508 includes a proximity beacon floor plan 510, an available power determination engine 512, and a power management engine 514. In a specific implementation, the proximity beacon floor plan datastore 510 functions according to an applicable datastore for storing proximity beacon floor plans, such as the proximity beacon floor plan datastores described in this paper. A proximity beacon floor plan can include a 2D representation of an area or a 3D representation of a volume of space of which the area is a footprint, indications of locations of network devices, and indications of locations at which a proximity beacon is supposed to be positioned.

In a specific implementation, the available power determination engine 512 functions to determine an amount of power available to a proximity beacon. The available power determination engine 512 can determine an amount of power available to a proximity beacon based on data received from the proximity beacon through a network device, e.g. network device 504. For example, the available power determination engine 512 can determine an amount of power available to a proximity beacon using a proximity beacon signal received from the proximity beacon through a network device to which the proximity beacon is coupled. Depending upon implementation-specific or other considerations, data received from a proximity beacon through a network device that the proximity beacon is coupled to, can specify an amount of power available to the proximity beacon.

In a specific implementation, the power management engine 514 functions to manage power of a proximity beacon according to an amount of available power determined for the proximity beacon. In managing power of a proximity beacon, the power management engine 514 can facilitate providing of power to the proximity beacon if an amount of power determined available to the proximity beacon is below a specific amount. For example, the power management engine 514 can facilitate the providing of power to a proximity beacon if it is determined that only 50% of an original available amount of power is available to the proximity beacon.

In a specific implementation, in facilitating the providing of power to a proximity beacon, the power management engine 514 can provide or instruct applicable systems or engines to provide power to the proximity beacon through the network device to which the proximity beacon is coupled. In another specific implementation, in facilitating the providing of power to a proximity beacon, the power management engine 514 can send a power warning message to a user that indicates a specific proximity beacon that has an amount of available power less than a specific amount. Depending upon implementation-specific or other considerations, a power warning message can include a location of a specific proximity beacon, as determined from a proximity beacon floor plan stored in the proximity beacon floor plan datastore 510. In response to a power warning a message, a user can supply power to a specific proximity beacon that is the subject of the power warning message.

In an example of operation of the example system shown in FIG. 5, the available power determination engine 512 functions to determine an amount of power available to the network device-coupled PBT 506 using data received from the network device-coupled PBT 506 through the network device 504. In the example of operation of the example system shown in FIG. 5, the power management engine 514 functions to facilitate supplying power to the network device-coupled PBT 506 if the amount of available power for the network device-coupled PBT 506 is beneath a specific amount. Further, in the example of operation of the example system shown in FIG. 5, in facilitating the supplying of power to the network device-coupled PBT 506, the power management engine 514 sends a power warning message to a user that includes an identification of the network device-coupled PBT 506 and a location of the network device-coupled PBT 506, as determined from a proximity beacon floor plan stored in the proximity beacon floor plan datastore 510.

Figure 6:
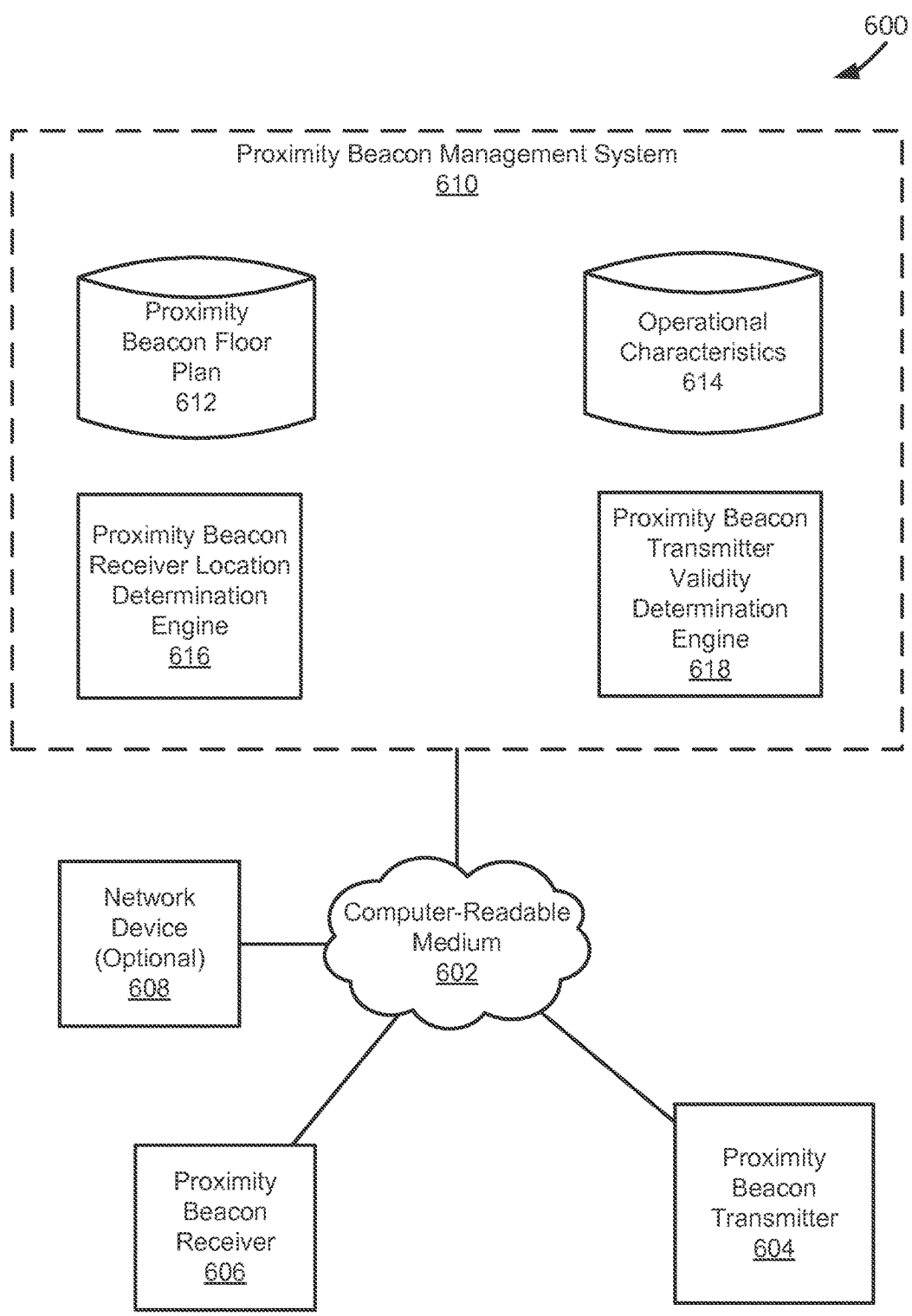
FIG. 6 depicts a diagram of an example of a system for validating a proximity beacon transmitter that sends a proximity beacon signal.

FIG. 6 depicts a diagram 600 of an example of a system for validating a proximity beacon transmitter that sends a proximity beacon signal. The example system shown in FIG. 6 includes a computer-readable medium 602, a PBT 604, a PBR 606, and a proximity beacon management system 610. The example system shown in FIG. 6 can also optionally include a network device 608. In the example system shown in FIG. 6, the PBT 604, the PBR 606, optionally, the network device 608, and the proximity beacon management system 610 are coupled to each other through the computer-readable medium 602. Depending upon implementation-specific or other considerations, the PBR 606 can be coupled to the computer-readable medium 602 through the network device 608.

In a specific implementation, the PBT 604 functions according to applicable devices for transmitting proximity beacon signals, such as the PBTs described in this paper. Proximity beacon signals transmitted by the PBT 604 include a uuid. A Uuid included in a proximity beacon signal transmitted by the PBT 604, can be used to specifically identify the PBT 604.

In a specific implementation, the PBR 606 functions according to an applicable device for receiving a proximity beacon signal, such as the PBRs described in this paper. The PBR 606 can receive a proximity beacon signal over a connection established in accordance with applicable lower power short range wireless communication protocol.

In a specific implementation, the network device 608 functions according to an applicable device for transmitting data to and from a backhaul of a network, such as the network devices described in this paper. Depending upon implementation-specific or other considerations, the network device 608 can transmit data to and from a PBT. Further depending upon implementation-specific or other considerations, the network device 608 can be coupled through a wireless connection to a PBR that acts as a client device in being coupled to the network device 608 through the wireless connection. In being coupled to a PBR through a wireless connection, the network device 608 can transmit data from a backhaul of a network, e.g. from systems coupled to the network device 608 through the backhaul of the network or systems coupled to the computer-readable medium 602, to the PBR over the wireless connection.

In a specific implementation, the proximity beacon management system 610 functions according to an applicable system for managing proximity beacons, such as the proximity beacon management systems described in this paper. Depending upon implementation-specific or other considerations, the proximity beacon management system 610 can transmit and receive data through the computer-readable medium 602 or a network device coupled to the computer-readable medium. Further depending upon implementation-specific or other considerations, the proximity beacon management system 610 can transmit and receive data through a PBR or a PBT coupled to the computer-readable medium 602 or through a network device coupled to the computer-readable medium 602 to which a PBR or a PBT are coupled. In managing proximity beacons, the proximity beacon management system 610 can validate a proximity beacon transmitter that transits a proximity beacon signal.

In the example system shown in FIG. 6, the proximity beacon management system 610 includes a proximity beacon floor plan datastore 612, an operational characteristics datastore 614, a PBR location determination engine 616, and a PBT validity determination engine 618.

In a specific implementation, the proximity beacon floor plan datastore 612 functions according to an applicable datastore for storing proximity beacon floor plans, such as the proximity beacon floor plan datastores described in this paper. A proximity beacon floor plan can include a 2D representation of an area or a 3D representation of a volume of space of which the area is a footprint, indications of locations of network devices, and indications of locations at which a proximity beacon is supposed to be positioned.

In a specific implementation, the operational characteristics datastore 614 functions according to an applicable datastore for storing operational characteristics of proximity beacons, such as the operational characteristics datastores described in this paper. Operational characteristics stored in the operational characteristics datastore 614 can be the operational characteristics at which a proximity beacon is supposed to operate. Operational characteristics stored in the operational characteristics datastore 614 can be generated using applicable systems and techniques, such as the applicable systems and techniques described in this paper.

In a specific implementation, the PBR location determination engine 616 functions to determine a location of a PBR that receives a proximity beacon signal from a PBT. Depending upon implementation-specific or other considerations, the PBR location determination engine 616 can determine a location of a PBR using applicable techniques and systems, including but not limited to GPS, or triangulation of the PBR in a wireless network, e.g. a cellular or Wi-Fi network. Further depending upon implementation-specific or other considerations, the PBR location determination engine 616 can determine a location of a PBR based on a network device to which the PBR is coupled. For example, if a PBR is coupled to a network device through a wireless connection, then the PBR location determination engine 616 can determine that the PBR is at a location within range of the network device.

In a specific implementation, the PBT validity determination engine 618 functions to determine whether a PBT that transmits a proximity beacon signal to a PBR is a valid PBT. In determining whether a PBT is a valid PBT, the PBT validity determination engine 618 can determine a specific PBT that is uniquely associated with a proximity beacon signal received by a PBR. Depending upon implementation-specific or other considerations, the PBT validity determination engine 618 can determine a PBT uniquely associated with a proximity beacon signal received by a PBR directly from the proximity beacon signal, or by looking up a uuid included in the proximity beacon signal in the operational characteristics datastore 614. Further in determining whether a PBT is a valid PBT, the PBT validity determination engine 618 can determine a transmission range around a location at which a PBT, uniquely associated with the proximity beacon signal, is supposed to be positioned. The PBT validity determination engine 618 can determine a transmission range using either or both a proximity beacon floor plan stored in the proximity beacon floor plan datastore 612 and operational characteristics stored in the operational characteristics datastore 614. The PBT validity determination engine 618 can determine whether a location of a PBR that receives a proximity beacon signal from the PBT, as determined by the PBR location determination engine 616, is within a determined transmission range for a PBT uniquely associated with a uuid included in a received proximity beacon signal to determine the validity of the PBT. For example, if a PBR is not near, or otherwise out of range from a location of a PBT that is uniquely associated with a uuid included in a proximity beacon signal received by the PBR, then the PBR validity determination engine 618 can determine that the PBT from which the proximity beacon signal was received by the PBR is not a valid PBT.

In an example of operation of the example system shown in FIG. 6, the proximity beacon receiver location determination engine 616 functions to determine a location of the PBR 606 that receives a proximity beacon signal from the PBT 604. In the example of operation of the example system shown in FIG. 6, the PBT validity determination engine 618 functions to determine whether the PBT 604 is a valid PBT, based on the determined location of the PBR 606 and a determined transmission range of a PBT uniquely associated with a uuid included.

Figure 7:
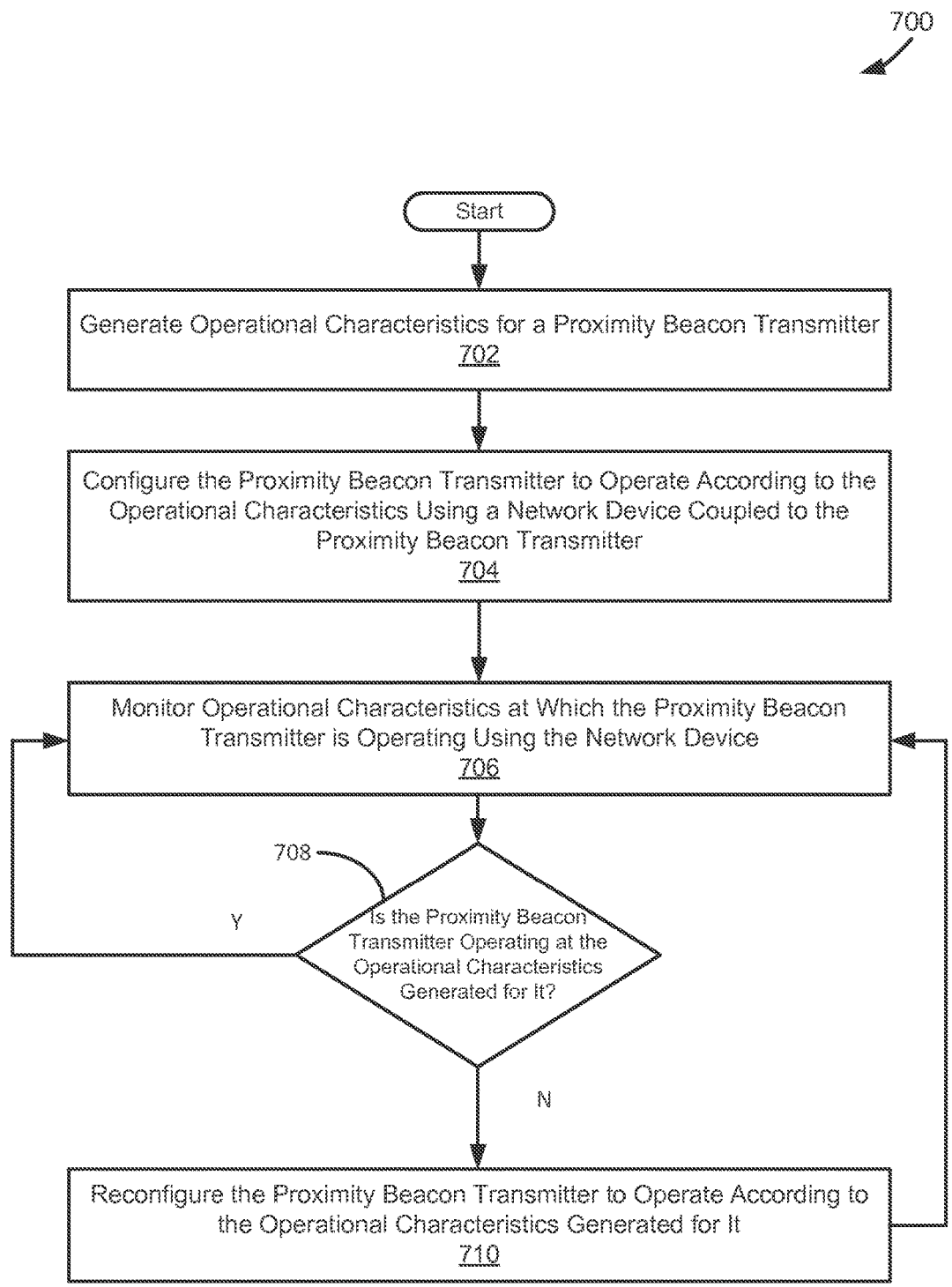
FIG. 7 depicts a flowchart of an example of a method for configuring and reconfiguring a proximity beacon using a network device.

FIG. 7 depicts a flowchart 700 of an example of a method for configuring and reconfiguring a proximity beacon using a network device. The flowchart 700 begins at module 702, where operational characteristics for a proximity beacon transmitter are generated. Depending upon implementation-specific or other considerations, operational characteristics can be generated for a proximity beacon from input received from a manager or an authority over the proximity beacon transmitter. For example, the operational characteristics can be generated based on received input from a manager over a proximity beacon transmitter, that indicates that the proximity beacon transmitter should transmit a proximity beacon signal four times every minute. Further depending upon implementation-specific or other considerations, operational characteristics can be generated for a proximity beacon independent of input received from a manager or an authority over the proximity beacon transmitter. For example a random uuid as included as part of operations characteristics can be created for a proximity beacon that the proximity beacon transmitter includes in transmitted proximity beacon signals. In another example, operational characteristics can be generated for a proximity beacon transmitter based on operational characteristics of similar proximity beacons transmitter.

The flowchart 700 continues to module 704, where the proximity beacon transmitter is configured using a network device that the proximity beacon transmitter is coupled to according to the operational characteristics generated for the proximity beacon. Depending upon implementation-specific or other considerations, in configuring the proximity beacon transmitter according to the generated operational characteristics for the proximity beacon, the proximity beacon transmitter can be programmed to operate according to the operational characteristics through a network device to which the proximity beacon transmitter is coupled. Further depending upon implementation-specific or other considerations, in configuring the proximity beacon transmitter, operational instructions can be generated and sent to the proximity beacon transmitter through a network device to which the proximity beacon transmitter is coupled. Operational instructions generated and sent to the proximity beacon transmitter can instruct the proximity beacon transmitter to operate according to the operational characteristics generated for the proximity beacon transmitter.

The flowchart 700 continues to module 706, where operational characteristics at which the proximity beacon transmitter is operating are monitored using the network device. Data can be received through the network device from the proximity beacon transmitter that is used to determine operational characteristics at which the proximity beacon transmitter is operating. Data received through the network device can include a proximity beacon signal or a status message, either of which can include the operational characteristics at which the proximity beacon transmitter is operating. Depending upon implementation-specific or other considerations, the proximity beacon transmitter can be configured to send data used in determining operational characteristics at which the proximity beacon transmitter is operating automatically at set times, or after being pinged.

The flowchart 700 continues to decision point 708, where it is determined if the proximity beacon transmitter is operation at the operational characteristics generated for it. If it is determined that the proximity beacon transmitter is operation in accordance with the operational characteristics generated for it, then the flowchart 700 continues back to module 706, where the operational characteristics at which the proximity beacon transmitter is operating is monitored using the network device. If it is determined that the proximity beacon transmitter is operating in nonconformity of the operational characteristics generated for the proximity beacon transmitter, then the flowchart 700 continues to module 710.

At module 710, the flowchart 700 includes, reconfiguring the proximity beacon transmitter to operate according to the operational characteristics generated for it. Depending upon implementation-specific or other considerations, in reconfiguring the proximity beacon transmitter, the proximity beacon transmitter can be reprogrammed, through the network device, to operate according to the operational characteristics generated for the proximity beacon transmitter. Further depending upon implementation-specific or other considerations, in reconfiguring the proximity beacon transmitter, operational instructions can be regenerated according to the operational characteristics generated for the proximity beacon and sent to the proximity beacon transmitter through the network device.

Figure 8:
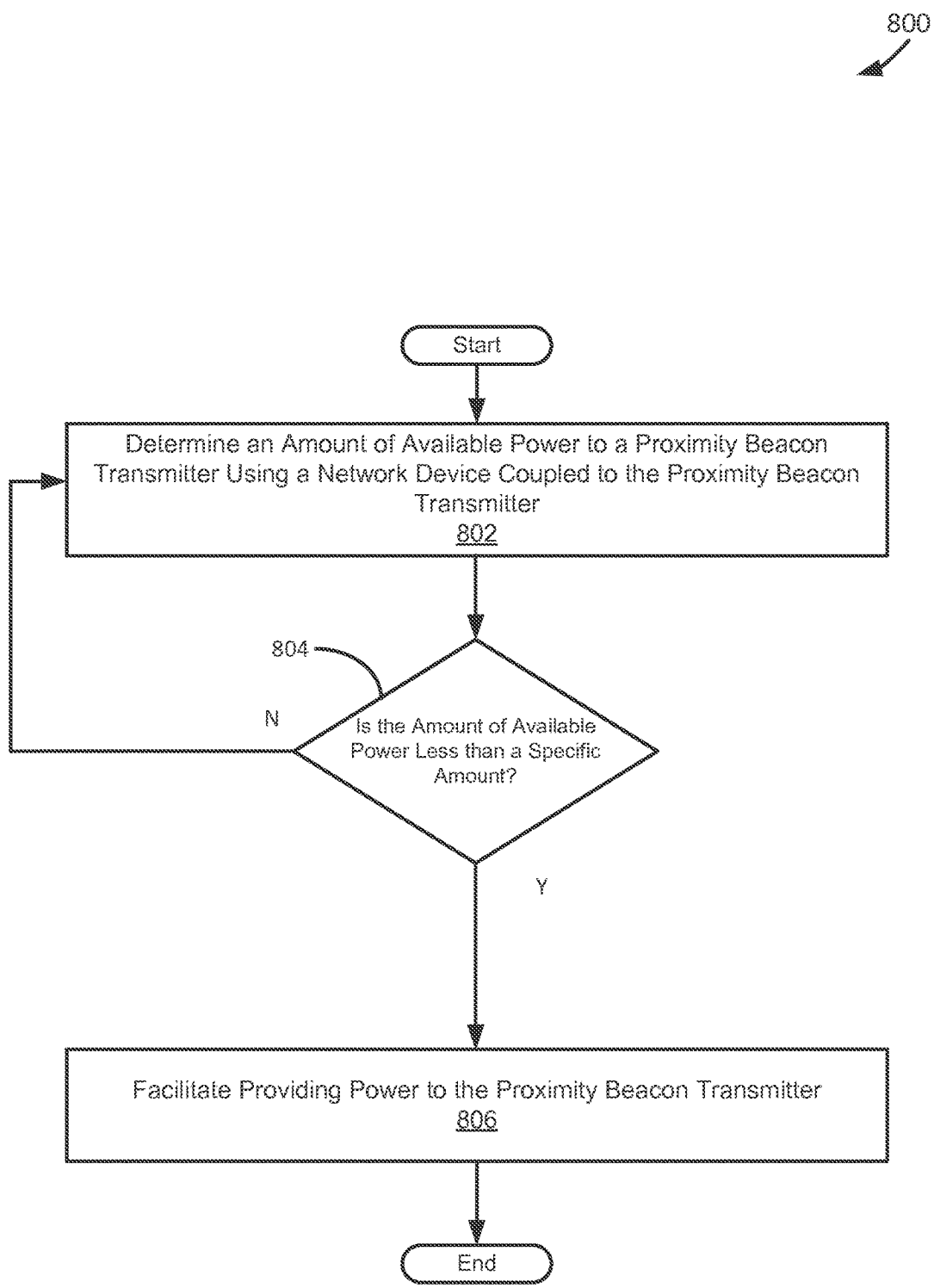
FIG. 8 depicts a flowchart of an example of a method for managing power in a proximity beacon using a network device to which the proximity beacon is coupled.

FIG. 8 depicts a flowchart 800 of an example of a method for managing power in a proximity beacon transmitter using a network device to which the proximity beacon transmitter is coupled. The flowchart 800 begins at module 802, where an amount of power available to a proximity beacon transmitter is determined using a network device to which the proximity beacon transmitter is coupled. An amount of power available to a proximity beacon transmitter can be determined based on data received from the proximity beacon transmitter through a network device to which the proximity beacon transmitter is coupled. Depending upon implementation-specific or other considerations, an amount of power available to a proximity beacon transmitter can be determined using a proximity beacon signal received from the proximity beacon transmitter through a network device to which the proximity beacon transmitter is coupled.

The flowchart 800 continues to decision point 804, where it is determined whether the amount of power available to the proximity beacon transmitter is less than a specific amount of power. Depending upon implementation-specific or other considerations, a specific amount of power can be set by a manager or authority of the proximity beacon transmitter or by a manufacturer of the proximity beacon transmitter. If it is determined at decision point 804 that the amount of power available to the proximity beacon transmitter is greater than a specific amount, then the flowchart 800 continues back to module 802, where an amount of power available to the proximity beacon transmitter is determined. As such, a power level of the proximity beacon transmitter can be constantly monitored. If it is determined at decision point 804 that the amount of power available to the proximity beacon transmitter is less than a specific amount, then the flowchart 800 continues to module 806.

At module 806, providing power to the proximity beacon transmitter is facilitated. Depending upon implementation-specific or other considerations, in facilitating the providing of power to the proximity beacon transmitter, applicable systems or engines to provide power to the proximity beacon transmitter through the network device can be instructed to provide power to the proximity beacon transmitter. Further depending upon implementation-specific or other considerations, in facilitating the providing of power to the proximity beacon transmitter, a power warning message can be sent to a manager or an authority over the proximity beacon. A power warning message can be sent to a manager using the network device to which the proximity beacon transmitter is coupled. A power warning message can include an identification of the proximity beacon transmitter and a location of a specific proximity beacon transmitter. In response to a power warning a message, a manager can supply power to the proximity beacon transmitter.

Figure 9:
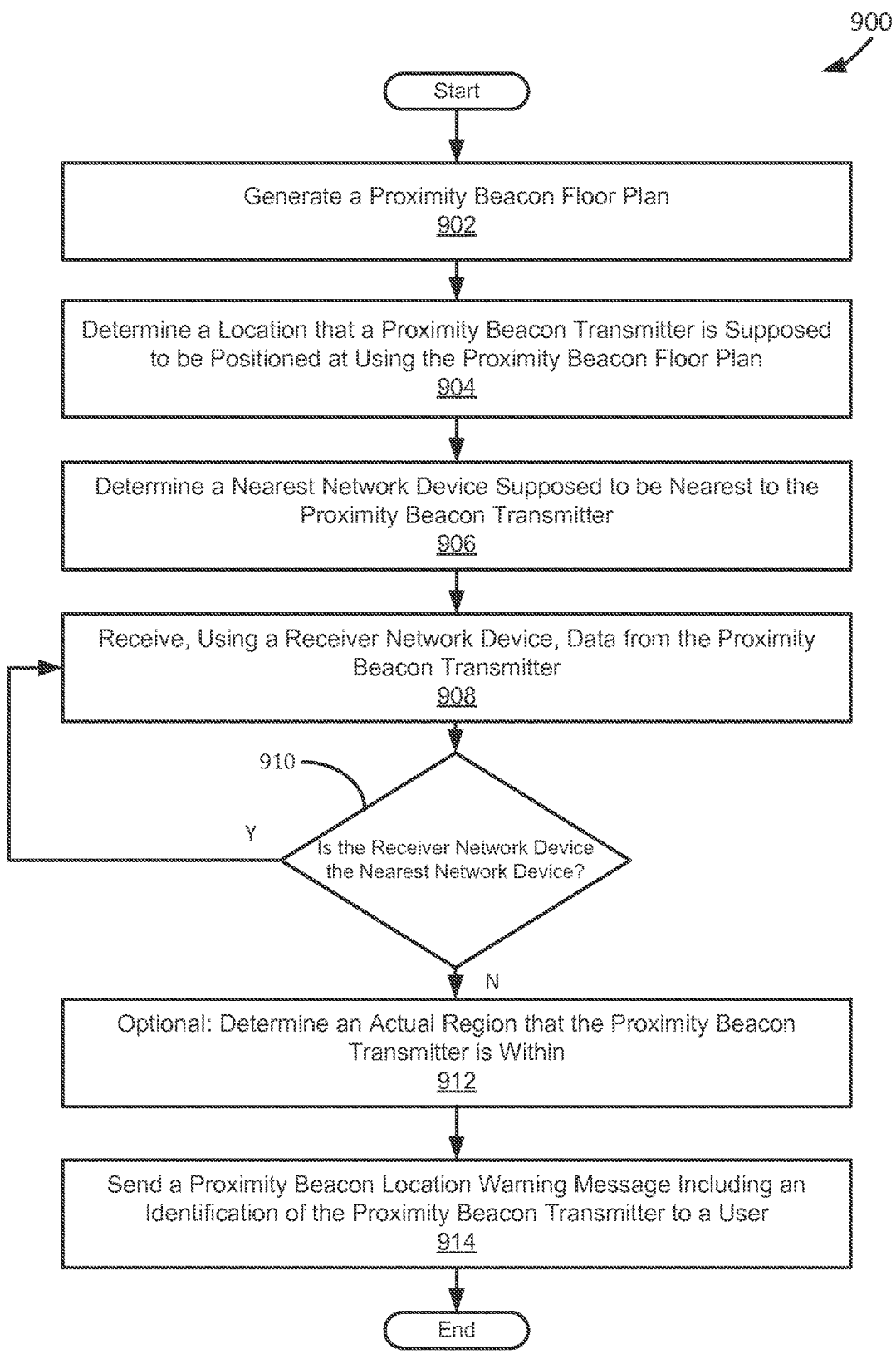
FIG. 9 depicts a flowchart of a method for managing positioning of proximity beacons using a network device.

FIG. 9 depicts a flowchart 900 of a method for managing positioning of proximity beacons using a network device. The flowchart 900 begins at module 902, where a proximity beacon floor plan is generated. A proximity beacon floor plan can include indications of positions of network devices and proximity beacon transmitters in an area or a volume of space of which the area is a footprint. Depending upon implementation-specific or other considerations, indications of proximity beacon locations and network device locations can be added and/or moved in response to input received from a user. A user can generate input regarding the placement of proximity beacon transmitters by viewing a proximity beacon floor plan on a device and selecting locations in the proximity beacon floor plan through the device. Depending upon implementation-specific or other considerations, a user can view a proximity beacon floor plan and generate input regarding the placement of proximity beacon transmitters using a device that is coupled to a network, including through a cellular network, or a wireless network formed through a network device that is coupled to proximity beacon transmitters.

The flowchart 900 continues to module 904, where a location that a proximity beacon transmitter is supposed to be positioned at is determined using the proximity beacon floor plan. A location that a proximity beacon transmitter is supposed to be positioned at, can be determined from an indication of a position of a proximity beacon transmitter included in the proximity beacon floor plan.

The flowchart 900 continues to module 906, where a nearest network device is determined using the proximity beacon floor plan. A nearest network device is a network device that is located nearest to the proximity beacon transmitter, if the proximity beacon transmitter is positioned at the location at which the proximity beacon transmitter is supposed to be positioned. A nearest network device can be determined based on an indication of a position of the proximity beacon transmitter and an indication of positions of network devices in the proximity beacon floor plan.

The flowchart 900 continues to module 908, where data is received at a receiver network device from the proximity beacon transmitter. A receiver network device can be any network device that receives data from the proximity beacon transmitter. Data received from the proximity beacon transmitter by a receiver network device can include a proximity beacon signal transmitted by the proximity beacon transmitter. Depending upon implementation-specific or other considerations, data can be received by a receiver network device either directly from the proximity beacon transmitter, or from the proximity beacon transmitter through a proximity beacon transmitter hub.

The flowchart 900 continues to decision point 910, where it is determined whether the receiver network device that receives data at module 908 is the nearest network device, as determined at module 906. If it is determined at decision point 910 that the receiver network device is the nearest network device, then the flowchart 900 continues back to module 908, where data is received by a receiver network device from the proximity beacon transmitter. If it is determined at decision point 910 that the received network device is not the nearest network device, then the flowchart 900 continues to optional module 912.

At optional module 912, an actual region that the proximity beacon transmitter is within is determined. An actual region that the proximity beacon transmitter is located in can be determined using the proximity beacon floor plan. An actual region that the proximity beacon transmitter is located in can be determined based on a location of the receiver network device, as determined from a proximity beacon floor plan. Additionally, in determining an actual region that a proximity beacon transmitter is located in, operational characteristics, e.g. a transmit signal power of a proximity beacon, can be used to determine a maximum radius away from the receiver network device that the proximity beacon transmitter can be located.

The flowchart 900 continues to module 914, where a proximity beacon location warning message, including an identification of the proximity beacon transmitter is sent to a user. A user can be an authority or a manager of the proximity beacon transmitter. A proximity beacon location warning message to a user device through a network, e.g. a cellular network, or a Wi-Fi network, through a network device coupled to the user device. A proximity beacon location warning message can include an identification of the proximity beacon transmitter and/or an actual region in which the proximity beacon transmitter is positioned.

Figure 10:
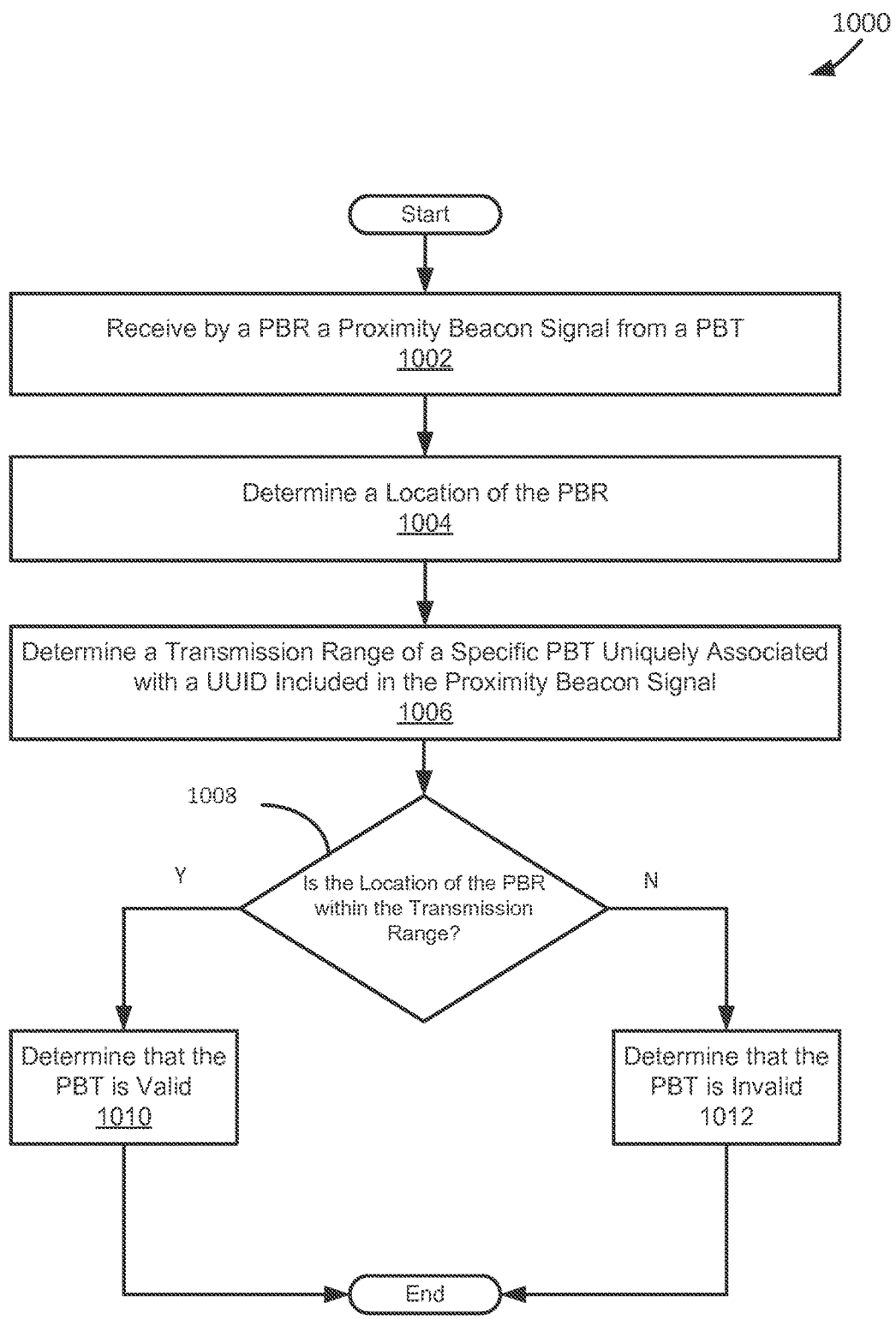
FIG. 10 depicts a flowchart of an example of a method for determined whether a proximity beacon transmitter is valid.

FIG. 10 depicts a flowchart 1000 of an example of a method for determined whether a PBT is valid. The flowchart 1000 begins at module 1002, where a proximity beacon signal is received by a PBR from a PBT. A PBR can receive a proximity beacon signal over a connection established in accordance with an applicable lower power short range wireless communication protocol. A proximity beacon signal received by the PBR includes a uuid that is uniquely associated with a PBT.

The flowchart 1000 continues to module 1004, where a location of the PBR is determined. Depending upon implementation-specific or other considerations, a location of the PBR can be determined using applicable techniques and systems, including but not limited to GPS, or triangulation of the PBR in a wireless network, e.g. a cellular or Wi-Fi network. Further depending upon implementation-specific or other considerations, a location of the PBR can be determined based on a network device to which the PBR is coupled. For example, if the PBR is coupled to a network device through a wireless connection, then a location of the PBR can be determined as a location within range of the network device.

The flowchart 1000 continues to module 1006, where a transmission range of a specific PBT uniquely associated with a uuid included in the proximity beacon signal is determined. In determining a transmission range, a specific PBT uniquely associated with a uuid included in the proximity beacon signal can be determined by looking up the uuid in operational characteristics data of proximity beacons. A transmission range of a specific PBT can be determined using a proximity beacon floor plan that includes the specific PBT uniquely associated with the uuid, and operational characteristics of the specific PBT. For example, a location of a specific PBT uniquely associated with the uuid can be determined using the proximity beacon floor plan, and the transmission range can be determined based on the location of the specific PBT and operational characteristics of the PBT.

The flowchart 1000 continues to decision point 1008, where it is determined if the location of the PBR is within the transmission range of the specific PBT uniquely associated with the uuid included in the proximity beacon signal. If it is determined at decision point 1008 that the location of the PBR is within the transmission range of the specific PBT, then the flowchart 1000 continues to module 1010, where is it determined that the PBT is valid. If it is determined at decision point 1008 that the location of the PBR is out of the transmission range of the specific PBT, then the flowchart 1000 continues to module 1012, where it is determined that the PBT is invalid.

Figure 11:
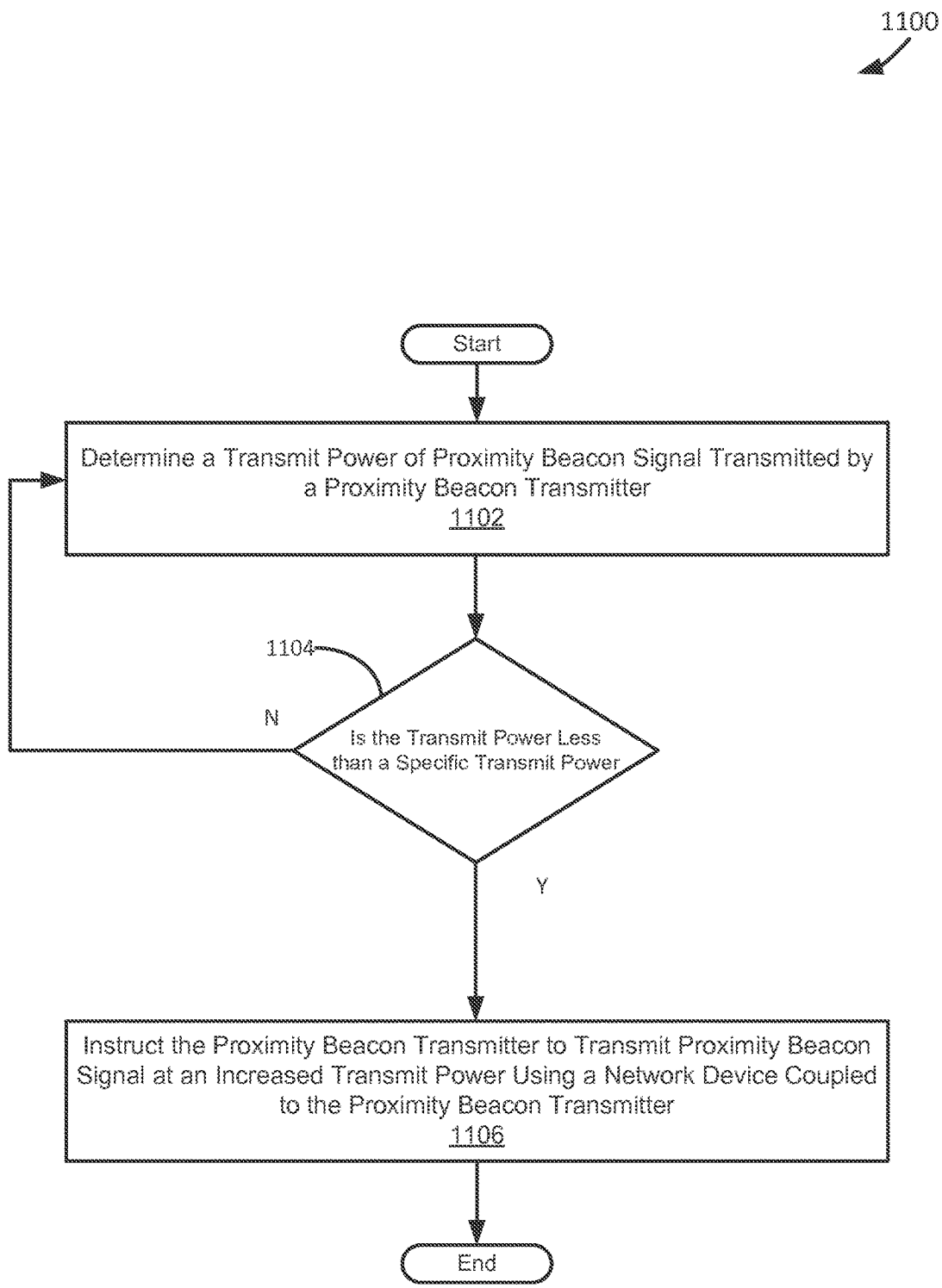
FIG. 11 depicts a flowchart of an example of a method for managing transmit power levels of proximity beacons transmitted by a proximity beacon transmitter using a network device.

FIG. 11 depicts a flowchart 1100 of an example of a method for managing transmit power levels of proximity beacons transmitted by a proximity beacon transmitter using a network device. The flowchart 1100 begins at module 1102, where a transmit power of a proximity beacon signal transmitted by a proximity beacon transmitter is determined. Depending upon implementation-specific or other considerations, a transmit power of a proximity beacon signal transmitted by a proximity beacon transmitter can be determined through a network device coupled to the proximity beacon transmitter, and/or a proximity beacon receiver that receives the proximity beacon signal.

The flowchart 1100 continues to decision point 1104 where it is determined whether the transmit power of the proximity beacon signal is less than a specific transmit power. The specific transmit power can be unique to the proximity beacon transmitter. Depending upon implementation-specific or other considerations, the specific transmit power can be set before the proximity beacon transmitter is deployed or after the proximity beacon transmitter is deployed. For example, the specific transmit power can be increased after the proximity beacon transmitter is deployed. If it is determined at decision point 1104 that the transmit power is not less than a specific transmit power, then the flowchart 1100 continues back to module 1102.

If it is determined at decision point 1104 that the transmit power is less than a specific transmit power, then the flowchart 1100 continues to module 1106. At module 1106, the proximity beacon transmitter is instructed to transmit proximity beacon signals at an increased transmit power using a network device to which the proximity beacon transmitter is coupled. For example, instructions can be sent through the network device from a proximity beacon management system to the proximity beacon transmitter that instruct the proximity beacon transmitter to increase the transmit power at which it transmits proximity beacon signals.

These and other examples provided in this paper are intended to illustrate but not necessarily to limit the described implementation. As used herein, the term "implementation" means an implementation that serves to illustrate by way of example but not limitation. The techniques described in the preceding text and figures can be mixed and matched as circumstances demand to produce alternative implementations.

We claim:

1. A method comprising:
   generating operational characteristics for a proximity beacon transmitter coupled to a network device through a proximity beacon transceiver hub physically connected to the network device through a wired connection, wherein the operational characteristics include a signal power at which the proximity beacon transmitter transmits signals, wherein the proximity beacon transceiver hub couples the proximity beacon transmitter to the network device to make the proximity beacon transmitter a network device-coupled proximity beacon transmitter, wherein the network device is configured to provide stations wireless access to network services of a network, and wherein the stations include proximity beacon receivers;
   configuring the proximity beacon transmitter through the network device according to the operational characteristics;
   determining if the proximity beacon transmitter is operating according to the operational characteristics in transmitting proximity beacon signals to the proximity beacon receivers;
   reconfiguring the proximity beacon transmitter according to the operational characteristics through the network device, if it is determined the proximity beacon transmitter is operating in nonconformity with the operational characteristics.

2. The method of claim 1, wherein the operational characteristics include a universally unique identifier uniquely associated with the proximity beacon transmitter, and wherein the universally unique identifier is included in the proximity beacon signals transmitted by the proximity beacon transmitter.

3. The method of claim 1, further comprising generating a proximity beacon floor plan that includes an indication of a location of the proximity beacon transmitter and an indication of a location of the network device.

4. The method of claim 1, further comprising:
   determining a location at which the proximity beacon transmitter is supposed to be positioned using a proximity beacon floor plan;
   determining a nearest network device to the proximity beacon transmitter at the location at which the proximity beacon transmitter is supposed to be positioned using the proximity beacon floor plan, the nearest network device configured to provide the stations wireless access to the network;
   receiving data at a receiver network device from the proximity beacon transmitter;
   determining if the receiver network device is the nearest network device to the proximity beacon transmitter;
   sending a proximity beacon location warning message that includes an identification of the proximity beacon transmitter to a user.

5. The method of claim 4, further comprising:
   determining a region in which the proximity beacon transmitter is located;
   including the region in which the proximity beacon transmitter is located in the proximity beacon location warning message.

6. The method of claim 5, wherein the region in which the proximity beacon transmitter is located is determined using the proximity beacon floor plan and the operational characteristics of the proximity beacon transmitter.

7. The method of claim 1, further comprising:
   determining an amount of power available to the proximity beacon transmitter using data received from the proximity beacon transmitter through the network device;
   determining if the amount of power available to the proximity beacon transmitter is less than a specific amount;
   facilitating providing power to the proximity beacon transmitter, if it is determined that the amount of power available to the proximity beacon transmitter is less than the specific amount.

8. The method of claim 1, further comprising:
   receiving by a proximity beacon receiver of the proximity beacon receivers, a proximity beacon signal of the proximity beacon signals including a universally unique identifier from the proximity beacon transmitter;
   determining a location of the proximity beacon receiver;
   determining a specific proximity beacon transmitter associated with the universally unique identifier;
   determining a transmission range of the specific proximity beacon transmitter using operational characteristics of the specific proximity beacon transmitter and a proximity beacon floor plan;
   determining if the location of the proximity beacon receiver is within the transmission range of the specific proximity beacon transmitter;
   determining that the proximity beacon transmitter is a valid proximity beacon transmitter for transmitting the proximity beacon signal, if it is determined that the location of the proximity beacon receiver is within the transmission range of the specific proximity beacon transmitter.

9. The method of claim 8, wherein the location of the proximity beacon receiver is determined through a cellular network.

10. The method of claim 1, further comprising controlling a transmit strength at which the proximity beacon transmitter transmits the proximity beacon signals through the network device.

11. A system comprising:
    an operational characteristics generation engine configured to generate operational characteristics for a proximity beacon transmitter coupled to a network device through a proximity beacon transceiver hub physically connected to the network device through a wired connection, wherein the operational characteristics include a signal power at which the proximity beacon transmitter transmits signals, wherein the proximity beacon transceiver hub couples the proximity beacon transmitter to the network device to make the proximity beacon transmitter a network device-coupled proximity beacon transmitter, wherein the network device is configured to provide stations wireless access to network services of a network, and wherein the stations include proximity beacon receivers;
an operational characteristics configuration engine configured to configure the proximity beacon transmitter through the network device according to the operational characteristics;
an operational characteristics monitoring engine configured to determine if the proximity beacon transmitter is operating according to the operational characteristics in transmitting proximity beacon signals to the proximity beacon receivers;
the operational characteristics configuration engine further configured to reconfigure the proximity beacon transmitter according to the operational characteristics through the network device if the operational characteristics monitoring engine determines the proximity beacon transmitter is operating in nonconformity with the operational characteristics.

12. The system of claim 11, wherein the operational characteristics include a universally unique identifier uniquely associated with the proximity beacon transmitter, and wherein the universally unique identifier included in the proximity beacon signals is transmitted by the proximity beacon transmitter.

13. The system of claim 11, further comprising a proximity beacon floor plan generation engine configured to generate a proximity beacon floor plan that includes an indication of a location of the proximity beacon transmitter and an indication of a location of the network device.

14. The system of claim 11, further comprising a proximity beacon location determination engine configured to:
determine a location that the proximity beacon transmitter is supposed to be positioned at using a proximity beacon floor plan;
determine a nearest network device to the proximity beacon transmitter at the location at which the proximity beacon transmitter is supposed to be positioned using the proximity beacon floor plan, the nearest network device configured to provide the stations wireless access to the network;
determine if a receiver network device that receives data from the proximity beacon transmitter is the nearest network device to the proximity beacon transmitter;
send a proximity beacon location warning message that includes an identification of the proximity beacon transmitter to a user.

15. The system of claim 14, wherein the proximity beacon location determination engine is further configured to:
determine a region in which the proximity beacon transmitter is located;
include the region in which the proximity beacon transmitter is located in the proximity beacon location warning message.

16. The system of claim 15, wherein the proximity beacon location determination engine determines the region in which the proximity beacon transmitter is located using the proximity beacon floor plan and the operational characteristics of the proximity beacon transmitter.

17. The system of claim 11, further comprising:
an available power determination engine configured to determine an amount of power available to the proximity beacon transmitter using data received from the proximity beacon transmitter through the network device;
a power management engine configured to:
determine if the amount of power available to the proximity beacon transmitter is less than a specific amount;
facilitate providing power to the proximity beacon transmitter, if it is determined that the amount of power available to the proximity beacon transmitter is less than the specific amount.

18. The system of claim 11, further comprising:
a proximity beacon receiver location determination engine configured to determine a location of a proximity beacon receiver of the proximity beacon receivers that receives a proximity beacon signal of the proximity beacon signals including a universally unique identifier from the proximity beacon transmitter;
a proximity beacon transmitter validity determination engine configured to:
determine a specific proximity beacon transmitter associated with the universally unique identifier;
determine a transmission range of the specific proximity beacon transmitter using operational characteristics of the specific proximity beacon transmitter and a proximity beacon floor plan;
determine if the location of the proximity beacon receiver is within the transmission range of the specific proximity beacon transmitter;
determine that the proximity beacon transmitter is a valid proximity beacon transmitter for transmitting the proximity beacon signal, if it is determined that the location of the proximity beacon receiver is within the transmission range of the specific proximity beacon transmitter.

19. The system of claim 11, wherein the operational characteristics configuration engine is further configured to control a transmit strength at which the proximity beacon transmitter transmits the proximity beacon signals through the network device.

20. A system comprising:
means for generating operational characteristics for a proximity beacon transmitter coupled to a network device through a proximity beacon transceiver hub physically connected to the network device through a wired connection, wherein the operational characteristics include a signal power at which the proximity beacon transmitter transmits signals, wherein the proximity beacon transceiver hub couples the proximity beacon transmitter to the network device to make the proximity beacon transmitter a network device-coupled proximity beacon transmitter, wherein the network device is configured to provide stations wireless access to network services of a network, and wherein the stations include proximity beacon receivers;
means for configuring the proximity beacon transmitter through the network device according to the operational characteristics;
means for determining if the proximity beacon transmitter is operating according to the operational characteristics in transmitting proximity beacon signals to the proximity beacon receivers;
means for reconfiguring the proximity beacon transmitter according to the operational characteristics through the network device, if it is determined the proximity beacon transmitter is operating in nonconformity with the operational characteristics.

* * * * *